United States Patent [19]
Mayer et al.

[11] Patent Number: 5,937,964
[45] Date of Patent: Aug. 17, 1999

[54] UNITARY POWER MODULE FOR ELECTRIC BICYCLES, BICYCLE COMBINATIONS AND VEHICLES

[75] Inventors: Richard A. Mayer, Saugus; Bruce S. Widmann, Simi Valley; Seth A. Terr, Burbank; Devin S. Bank, Los Angeles; Malcolm R. Currie, Agoura, all of Calif.

[73] Assignee: Currie Technologies Incorporated, Van Nuys, Calif.

[21] Appl. No.: 09/028,119

[22] Filed: Feb. 23, 1998

Related U.S. Application Data

[60] Provisional application No. 60/040,865, Mar. 18, 1997.

[51] Int. Cl.$^6$ .................................................... B62D 61/02
[52] U.S. Cl. ........................................... 180/220; 180/205
[58] Field of Search .................................... 180/205–207, 180/216, 217, 220, 65.1; 280/288.4, 236, 238; 301/6.5, 55, 51, 111

[56] References Cited

U.S. PATENT DOCUMENTS

| | | | |
|---|---|---|---|
| 2,575,873 | 11/1951 | Henney | 180/33 |
| 3,431,994 | 3/1969 | Wood | 180/31 |
| 3,921,745 | 11/1975 | McCulloch | 180/33 C |
| 5,316,101 | 5/1994 | Gannon | 180/221 |

*Primary Examiner*—Matthew C. Graham
*Assistant Examiner*—C. T. Bartz
*Attorney, Agent, or Firm*—McDermott, Will & Emery

[57] ABSTRACT

An electric bicycle comprises a frame having a rider seat and propulsion controls positioned and thereon, a settable front wheel having an axle affixed to a front portion of said frame, and a hub spoke rear wheel having an axle with a woven spoke pattern affixed to a rear portion of said frame. A unitary power module, which may be a "kit" for use with a standard bicycle, is used as a propulsion system which includes a battery affixed to said bicycle, and an electric motor having a pinion sprocket affixed thereon. The electric motor is suitable to be connected to the battery by a battery cable. The unitary power module includes a target sprocket and a mounting frame, with the target sprocket comprising a disk shaped assembly having an center opening to allow the unitary member to be placed about the wheel axle. The target sprocket mates to the wheel pattern of either of the wheels to enable target sprocket to be concentrically attached to the wheel by engagement with the wheel by securing elements. The mounting frame is aligned with and rotatably attached to the target sprocket to allow for aligned rotation of the target sprocket about said wheel axle. The mounting frame is attached to the unitary member by a bearing or the like and has an opening to receive the electric motor to enable a pinion sprocket to engage the target sprocket to rotate the rear wheel upon application by the rider of the propulsion controls. A free wheel clutch is provided on the unitary power module or target sprocket to allow the wheel to rotate faster than the motor without motor drag. In this manner, a self-aligned unitary power module is provided by the mounting frame maintaining a single point of reference for aligning the pinion sprocket with the target sprocket.

70 Claims, 22 Drawing Sheets

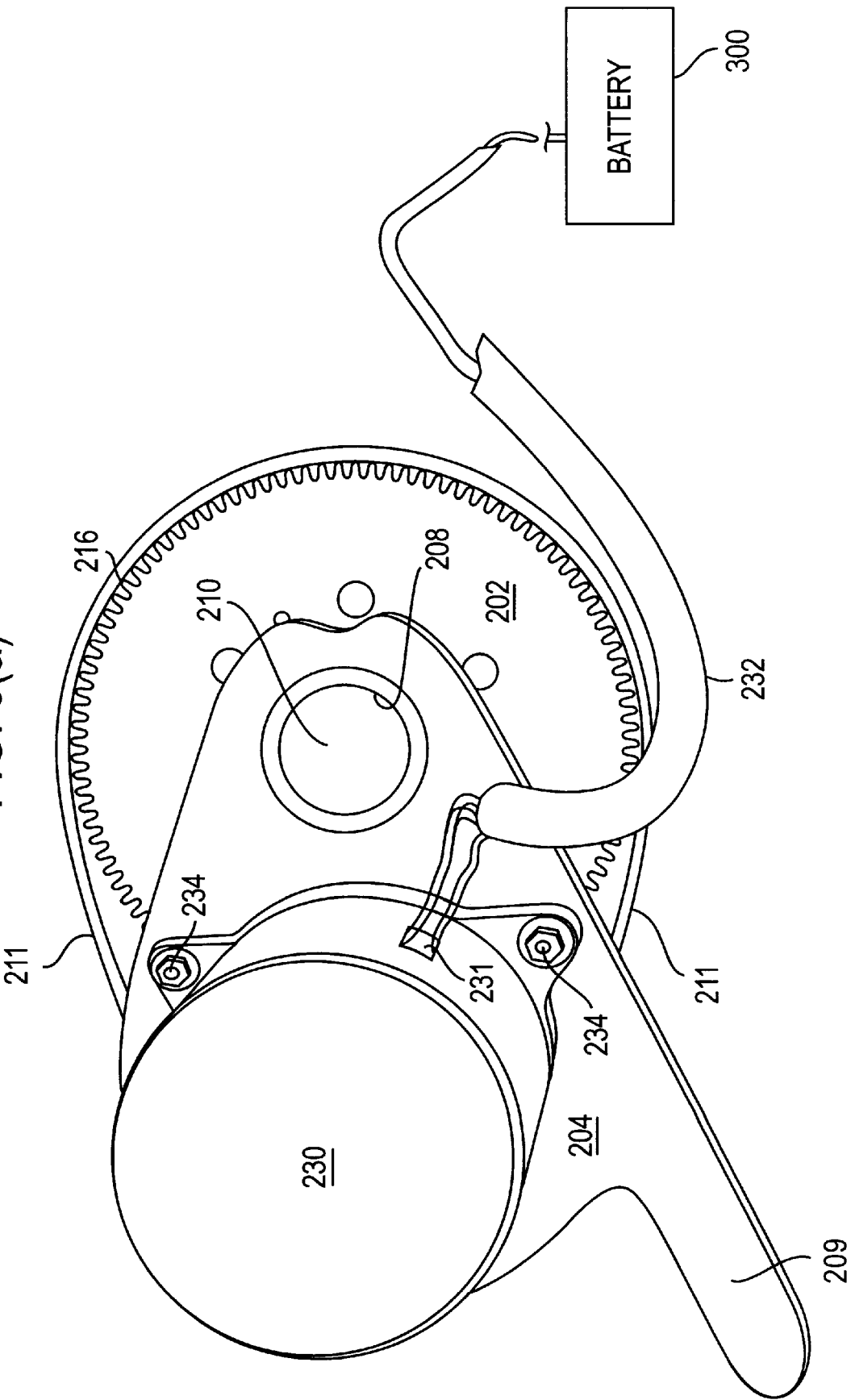

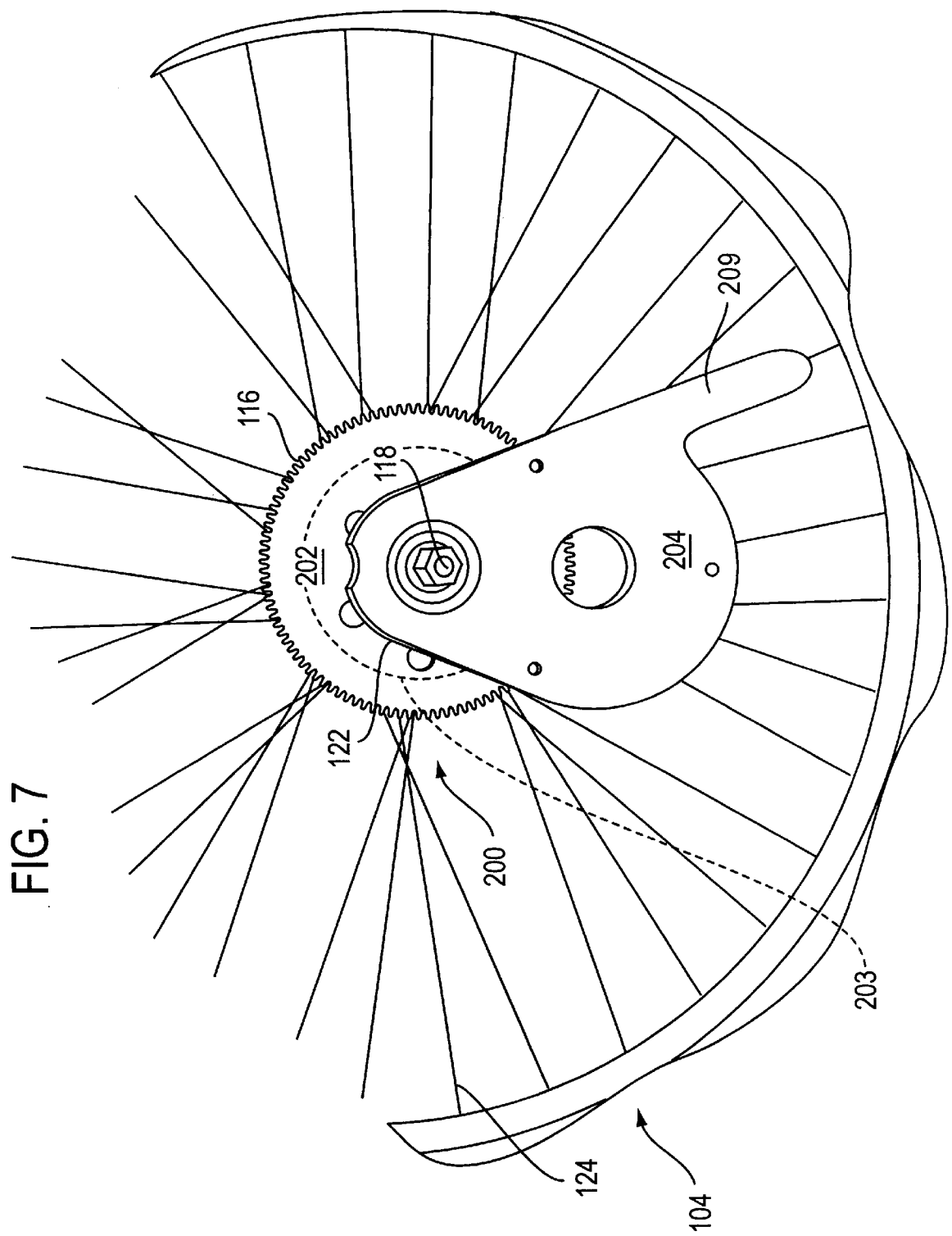

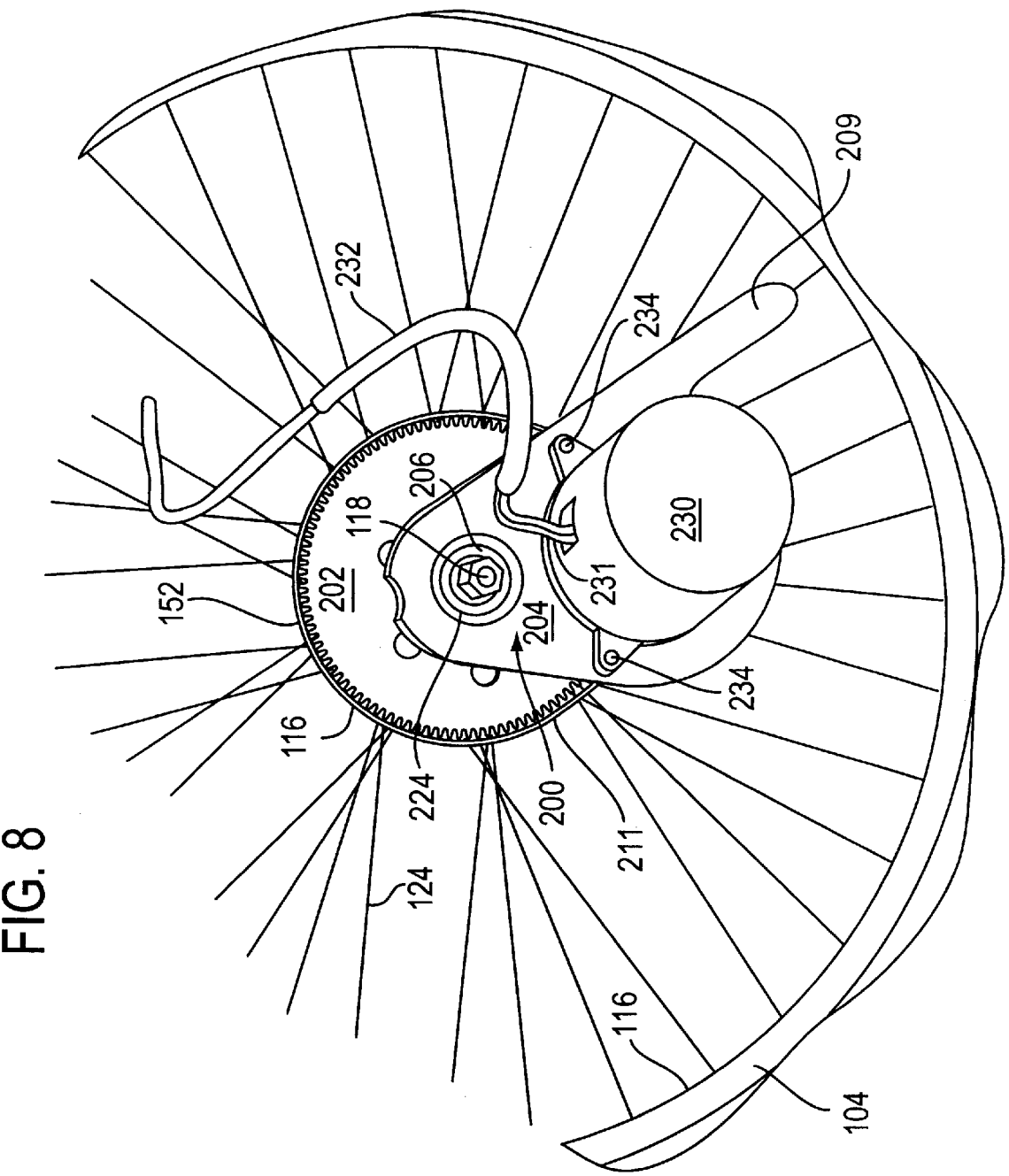

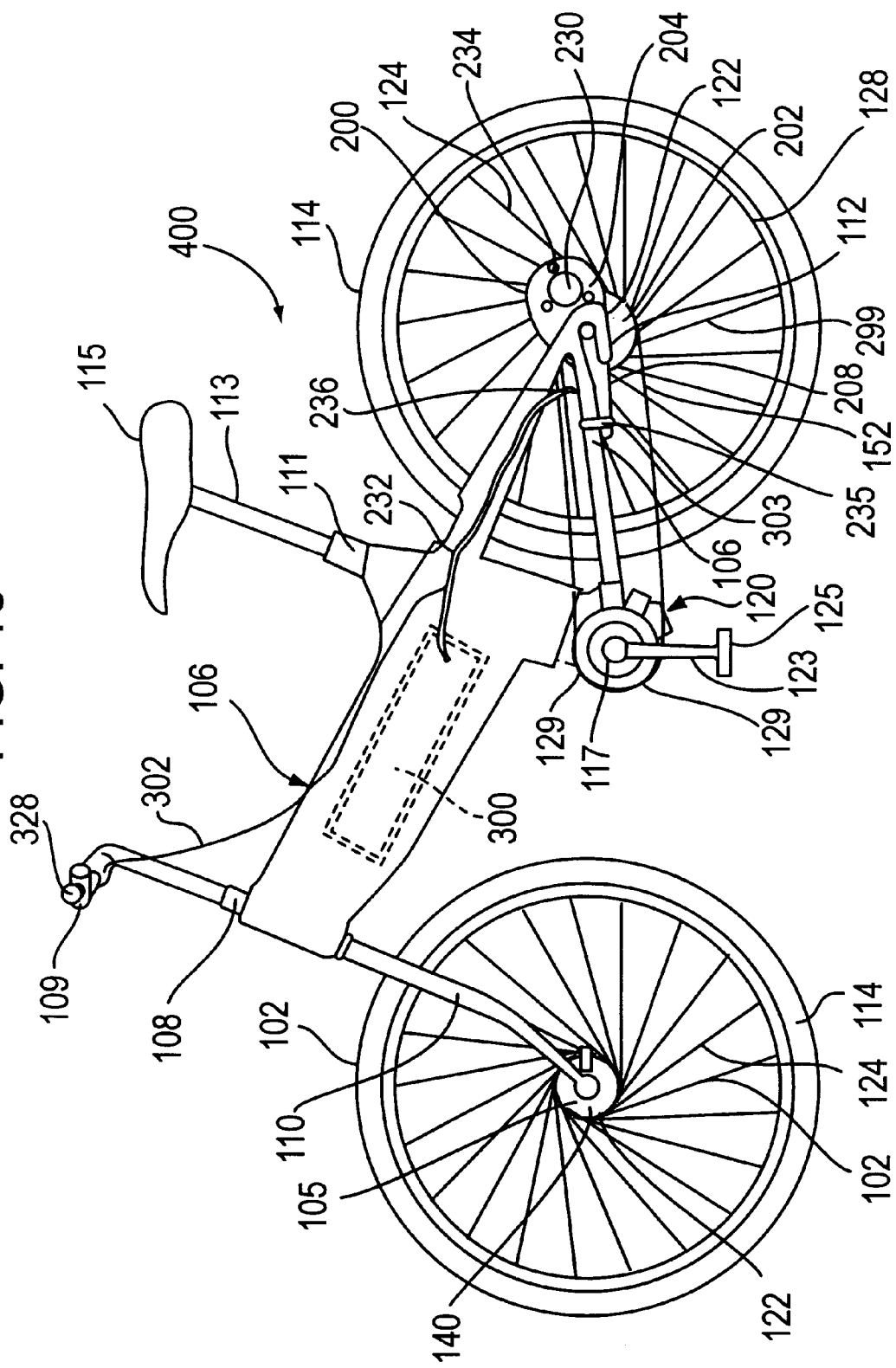

UNITARY POWER MODULE FOR ELECTRIC BICYCLES, BICYCLE COMBINATIONS AND VEHICLES

This application claims benefit of Provisional Application No. 60/040,865, filed Mar. 18, 1997.

BACKGROUND OF THE INVENTION

The present invention relates to an electric motor bicycle, and more particularly to an unitary self-contained direct drive power module (or "unitary power module") for electric bicycles or other vehicles. The invention also includes a kit for converting a standard bicycle into an electric bicycle by use of the unitary power module.

By way of background information, and turning now to the drawings, FIG. 19(a) illustrates a standard bicycle 100 ("or bicycle"), which is a two wheeled vehicle comprised typically of a front steering wheel 102 and a rear wheel 104, which may be attached to the frame by quick-disconnect units 105. The standard bicycle 100 includes a frame assembly 106 having a head tube 108 which journals a front fork 110 for steering via handle bars 109 by a rider of the bicycle 100. As illustrated in FIG. 19(b), the rear wheel 104 is journalled at the rear end of the frame 106 by a pair of rear stays (or "dropouts") 112. A seat tube 111 is carried by the frame 106 adjacent the rear wheel 104 and a seat post 113 upon which a saddle type seat 115 is positioned thereon to accommodate a rider.

In the standard bicycle 100, a horizontally oriented journal (or crank journal) 117 is positioned beneath the seat tube 111 which supports a rider "propelled" drive mechanism 120. The drive mechanism 120 generally comprises a crank 123 journalled in the crank journal 117, which includes a chain sprocket 129 having a plurality of teeth, together with the crank 123 positioned therein with along with pedals 125 rotatably journalled at each end 127 of the crank 123.

Each wheel typically consists of a tire 114 mounted on a rigid rim 116, an axle 118, a hub mechanism (or "hub") 122 and spokes 124 connecting the rigid rim 116 to the hub 122 to form an axle/hub assembly 121. The hub 122 surrounds the axle 118 and is free to rotate about the axle 118 through a bearing assembly 126 (not shown). The tire/rim assembly 128 is attached to the hub 122 through an assembly of the spokes 124 which are assembled in a woven pattern 130 to form a wheel/hub assembly 140. This woven pattern 130 of spokes has relatively few variations with a large quantity of existing bicycle wheels being common in using the same or similar thirty-six or thirty-four spoke weave pattern 130. A target "chain" sprocket 150 is mounted about the rear wheel 104, and is connected to the crank sprocket 129 by a chain 152 whereby application of power by the rider on the pedals 125 propels the bicycle 100. A derailleur 154 is often substituted for the single target sprocket 150 (or target sprocket), and may have a plurality of sprockets 156, 158, 160, 162, 164 and 166 (illustrated in FIG. 9) to provide variable gearing for rider comfort when either starting or climbing hills or for rider efficiency.

One of the features of a bicycle, is the ability of the wheel to be removed for servicing, such as repairing a flat. As described above, the typical bicycle wheel is constructed of a tire/rim assembly connected to the hub through a series of woven spokes. The hub rides on the axle of the wheel using a bearing assembly. The axle/hub assembly typically has rather loose manufacturing tolerances and as such provides a poor reference frame for the propulsion elements of prior systems. This occurs because bicycles are typically high rate, low-cost, manufactured consumer products, whereby the tolerances of components are not as high as a high quality mechanism. The majority of bicycles sold in the world and in use are in the lower or looser tolerance ranges. Also, when the wheel (or tire) is repaired and then replaced in the dropouts of the frame, the axle can become slightly cocked with respect to the frame. As such, tolerances for the mounting slots of the wheel axle allow for a wide latitude of assembly. The loose manufacturing tolerances of the axle and axle/hub bearings is typical of such low-cost mechanisms. These large tolerances of wheel and bicycle frame components present a significant problem in the design of reliable direct drive propulsion systems where various components of the system are mounted on different parts of the bicycle (eg., on the frame, on the axle, etc.)

If the various components of the propulsion system are mounted on bicycle components, which have loose tolerances in reference to each other, then the propulsion system suffers (or will suffer) from these same poor alignment tolerances with rough usage. In order to avoid excessive wear, reduced efficiency, and reduced performance as a result of such loose tolerances, an effective propulsion system should ideally utilize a design which is independent of such loose tolerances in the axle/hub assembly of the bicycle as well as the changing tolerances relative to the frame. It is this design concept which forms this invention.

In the past, electric propulsion systems for bicycles have been implemented through a variety of methods which utilized electric motor power to either supplement or replace the above rider drive mechanism in propelling the bicycle. For example, these methods include friction roller drives, belt drives, gear drives, and chain drives. For example, friction drives typically involve the application of an electric motor or "the drive source" to a wheel or "the target mechanism" through a roller mechanism. The roller may be directly attached to the drive source or through a clutch mechanism. The roller transfers the drive source energy through the contact of the roller on the target wheel through friction between their respective surfaces. This type of drive system suffers from mechanical losses associated with slippage between the roller mechanism and the target wheel as a result of reduced friction and from the energy required to compress the rubber tire. Performance in moisture, rain, snow and mud is marginal at best.

By way of further example, electric bicycles having direct drive systems, such as belt, gear and chain drives, typically provide higher energy coupling efficiencies than the roller friction drive systems. These systems however require a high degree of mechanical integrity in the geometry of drive components. For instance, there needs to be sufficient tension in the belt and chain of the belt and chain drive systems and the proper alignment or meshing of the gears in the gear drive system. Proper and exact mechanical alignment must be maintained rigidly with shock and many tire and wheel repairs in order to extend the life of the unit.

There have been a number of designs which can provide direct coupling between an electric motor(s) mounted externally to the rear bicycle wheel and the axle of the wheel. For example, a motor can be mounted either on the diagonal or horizontal rear members (or "stays") of the frame. A direct coupling in these cases can be effected through a 90-degree bevel gear between a shaft from the motor and the axle-hub assembly. In this case, external shocks will cause gear wear. Further, it is difficult to remove the rear wheel for repair. The drive can be effected through a chain, which is better but still mechanically complex and subject to the same kind of problems. It is also difficult to achieve the right reduction ratios between the RPM of typical motors and that of the rear wheel, typically between 10:1 and 25:1. A motor can be mounted above the rear wheel and drive a very large "sprocket" of diameter almost as large as the wheel diameter. Such systems have been demonstrated but have not been accepted because they are clumsy, top-heavy and subject to relative dislocation of the elements.

Other direct drives have been reduced to practice with the motor mounted in the neighborhood of the pedal crank. These can be coupled to the rear wheel by a gear drive with suitable clutches within the crank housing and thence through the usual bicycle chain or through a separate long chain to a separate sprocket on the rear wheel. They can also be coupled to the rear wheel through long shafts and bevel gears. While some of these are workable and practical, they require a special custom bicycle design which may be more expensive than desired.

For designs in which a motor mounted externally to the rear wheel, an improvement is described in patent application Ser. No. 08/803,067 entitled "Precision Direct Drive Mechanism for a Power Assist Apparatus for a Bicycle", by Mayer et al. filed on Feb. 20, 1997. In this concept, a motor is mounted on a plate which is separately indexed to the axle of the rear wheel. The motor drives a pinion gear (or pinion sprocket) which is separately indexed to the axle of the rear wheel, which, through meshed gears, a chain or a belt drives a target gear (or sprocket) which also is attached to the axle through a bearing or free-wheel clutch arrangement. That is, the motor-pinion assembly with its mounting frame and the target gear (or sprocket) are separately indexed off the axle, with the target gear (sprocket) actually indexed from the hub.

Thus, these elements in a benign environment are accurately aligned with respect one another, all being indexed from presumably common and concentric points. However, even with this improved and more compact configuration, we have found in practice that for most bicycles, the axle bearing tolerances and the hub bearing tolerances are highly variable with real world rough usage and shocks. In more detail, if the mesh between the pinion sprocket (or gear) and the target sprocket (or gear) occurs at a long leverage arm from the axle, the looseness of the bearings can change the pinion/target gear meshing or alignment, leading to eventual gear wear, tooth breakage, or misalignments of such sprockets. Additional concerns are the difficulty of achieving the alignment of shafts (such as the shafts of the motor, or the target wheel) and the manufactured tolerances of components over time and with normal rough usage.

Another class of direct drive systems are based on "hub motors" which are designed into the wheel hubs of front or rear wheels. This class of drives has its own cost considerations and performance characteristics.

None of the above described electric bicycle drive propulsion systems provides the important advantages of the inventive unitary power module for an electric bicycle propulsion system which has a high degree of mechanical integrity in the alignment geometry of the drive components even under shock and rough usage. These advantages are achieved by uniquely configuring the unitary power module having drive components comprising a drive source (or an electric motor), a pinion drive coupling component (such as a chain sprocket, gear or pulley pinion or combination thereof), a target mechanism coupling component (or a chain sprocket, driven gear, or belt sprocket), the actual mechanical coupling mechanism to the target or target wheel, and the target or driven wheel, itself, which is the normally the rear wheel. By use of various sprocket ratios, the invention may achieve a wide-range of gear ratios and therefore adaptability to a wide range of motors. Also, by the use of a free-wheel clutch incorporated into the unitary power module, the bicycle is completely free wheeling with virtually no drag in the absence of applied power. Still further, when in production, the unitary power module can be assembled and tested as an integral operating unit, and then be easily and simply attached to the bicycle frame.

Specifically, the present invention achieves these advantages by utilizing a unitary power module having mounting frame assembly on which all propulsion elements are mounted and aligned with a wheel fitting (or "drive") coupler, which is a disk shaped assembly with a large center opening allowing the target coupler to be placed about a wheel axle outside of the hub diameter. In the preferred embodiment, the target coupler has a groove pattern mating the woven spoke pattern of a bicycle wheel to enable the target coupler to be concentrically attached to the target wheel by engagement with the woven spoke pattern by securing elements. The mounting frame is attached to the target coupler by a bearing or the like, including a free wheel clutch. The mounting plate and has an opening (or "element") to receive an electric motor to enable a pinion sprocket or gear affixed on the motor to engage the sprocket and through a chain to the target sprocket (or gear) to rotate the target bicycle wheel upon suitable power application by a rider via propulsion controls on the bicycle.

Thus, the present invention provides the advantages of having a separate independent self-contained (and self-aligned) unitary power module which overcomes misalignment problems between the drive source and the target by using a common reference frame. The integrity of the chain alignment or gear mesh is thereby permanently ensured even in rough terrain and rough shock and usage. This invention can thus be advantageously implemented by using a chain drive, gear drive or belt drive system because one of its important advantages is its inherent avoidance of the usual misalignment causes by the above prior art devices. It has the additional advantage of being easily installed on almost any bicycle rear wheel by an unique and separately described mechanical coupler. It works efficiently, essentially independent of frame and axle/hub assembly and wheel/hub tolerances.

SUMMARY OF THE INVENTION

According to the invention, a unitary power module for mounting a propulsion system on a bicycle comprises a mounting frame having a motor and a target sprocket integrally mounted on the mounting frame. The target sprocket defines a disk shaped member having a center opening to allow the drive sprocket to be placed about a wheel axle of the bicycle. The drive sprocket mates with a bicycle wheel through a clutch and target coupler to enable the sprocket to be mounted substantially concentrically to an axle of the wheel by engagement with a wheel pattern of the bicycle by securing elements. The mounting frame is rotatably attached to the target sprocket to allow for "aligned" rotation of the target sprocket about the wheel axle, and proper alignment with an electric motor. The mounting frame has an element to receive an electric motor to enable a pinion sprocket affixed to the motor to propel the target sprocket and rotate the bicycle wheel. In the manner, the mounting frame provides a single point of reference for aligning the pinion sprocket with the target sprocket, i.e., thereby allowing the unitary power module to operate by itself, for example on a bench, independent of the bicycle per se.

In another embodiment of the invention, a propulsion system kit is provided for converting a standard bicycle having a frame and front and rear wheel, with the rear wheel having an axle and hub together with a wheel pattern into an electric bicycle. The kit comprises a battery suitable to be affixed to the bicycle, an electric motor having a target sprocket (or gear) affixed thereon, with the electric motor suitable to be connected to the battery by a battery cable. A unitary member comprises a target sprocket, a mounting frame and gear reduction or chain mechanisms which are precisely aligned with each other. The target coupler sprocket comprises a disk shaped assembly having an center opening to allow the unitary member to be placed around the axle outside the hub. The target coupler has a pattern which mates a pattern of the rear wheel to the target sprocket to enable the target sprocket to be concentrically attached to the wheel spokes by engagement with the spoke pattern by securing elements. The mounting frame is rotatably attached to the unitary member by a bearing or the like and has an opening to receive the electric motor to enable the driver to engage the target sprocket for aligned rotation of the wheel upon application of by the rider of electrical propulsion controls affixed to the bicycle. The free wheel clutch can be mounted either in the motor-pinion sprocket shaft or in the wheel attachment mechanism. Thus, the mounting frame provides a single point of reference for aligning the pinion sprocket with the target sprocket.

In yet another embodiment of the invention, an electric bicycle comprises a frame having a rider seat and propulsion controls positioned thereon. A steerable front wheel has an axle affixed to a front portion of said frame, together with a rear wheel having an axle with a wheel pattern affixed to a rear portion of the frame. A propulsion system comprises a battery affixed to the bicycle, and an electric motor having a driver affixed thereon the electric motor suitable to be connected to the battery by a battery cable. A unitary power module comprises a target coupler and a mounting frame, with a target coupler comprising a disk shaped member having an center opening to allow the drive member to be placed about the wheel axle. The target coupler is affixed to the rear wheel to enable the target sprocket to be concentrically attached to the rear wheel by engagement with the wheel by securing elements. The mounting frame is secured to a fixed portion of the frame in order to transmit torque and is attached to the unitary member through a bearing or the like and has an opening to receive the electric motor to enable the driver to engage the target sprocket for aligned rotation of the rear wheel upon application by the rider of the propulsion controls. Thus, the mounting frame provides a single point of reference for aligning the pinion sprocket with the target sprocket.

Preferably, in accordance with the invention, a unitary power module for mounting a propulsion system on a bicycle comprises a target sprocket defining a disk shaped member having a center opening to allow the target coupler to be placed about a wheel axle of the bicycle. The target coupler mates a bicycle wheel to enable the sprocket to be substantially concentrically attached to said wheel by engagement with said woven spoke pattern by securing elements. A mounting frame is rotatably attached to the target sprocket to allow for rotation of the target sprocket about the wheel axle and has an opening suitable to receive an electric motor to enable a driver sprocket affixed to the motor to engage a second sprocket mounted by a second shaft positioned on the mounting frame. The second sprocket shaft is positioned to drive the target coupler and rotate the bicycle wheel.

In another preferred embodiment, a propulsion system kit is provided for converting a standard bicycle having a frame and front and rear wheels, with each having a hub, axle and a wheel spoke pattern, into an electric powered bicycle. A battery suitable to power an electric motor is affixed to the bicycle, together with an electric motor having a driver affixed thereon. The electric motor is suitable to be connected to the battery via a battery cable. An unitary power module for mounting a propulsion system on a bicycle comprises a target sprocket defining a disk shaped member having a center opening to allow the target sprocket to be placed about a wheel axle of the bicycle with the target sprocket mating the bicycle wheel pattern to enable the sprocket to be substantially concentrically attached to the wheel by engagement with the pattern by securing elements. A mounting frame is aligned to and rotatably attached to the target sprocket to allow for aligned rotation of the target sprocket about the wheel axle and has an opening to receive the electric motor, which enables the driver to engage a second sprocket positioned thereon. The second sprocket is mounted on a second shaft which engages the target sprocket to propel the target sprocket and rotate said bicycle wheel upon application by a rider of propulsion controls positioned on a bicycle frame. The mounting frame provides a single point of reference for aligning the pinion sprocket with the target sprocket.

In yet another preferred embodiment, an electric bicycle comprises a frame having a rider seat and propulsion controls positioned and thereon. The bicycle includes a steerable front wheel having an axle affixed to a front portion of the frame, and a rear wheel having an axle with a pattern affixed to a rear portion of the frame. A propulsion system for the bicycle comprises a battery affixed to the bicycle, and an electric motor having a driver affixed thereon, the electric motor suitable to be connected to the battery by a battery cable. A unitary power module for mounting a propulsion system on the bicycle comprises a target sprocket defining a disk shaped member having a center opening to allow the target sprocket to be placed about a wheel axle of the bicycle. The target sprocket mates with a bicycle through a wheel coupler to enable the target coupler to be substantially concentrically attached to the wheel by engagement with the wheel pattern by securing elements. A mounting frame is aligned and rotatably attached to the target sprocket to allow for aligned rotation of the target sprocket with the driver about the wheel axle and has an opening to receive the electric motor to enable the driver affixed on the motor to engage a second sprocket positioned on a shaft. The second sprocket shaft is disposed to engage the target sprocket to propel the target sprocket and rotate the bicycle wheel upon application by a rider of propulsion controls positioned on the bicycle. The mounting frame provides a single point of reference for aligning the pinion sprocket with the target sprocket.

Preferably, the above embodiments having the second sprocket and shaft include a third sprocket concentrically mounted upon with the second shaft, with the driver rotating the second sprocket, which in turn rotates the third sprocket which is positioned to engage the target sprocket.

In more detail, and by way of example, the target sprocket is preferably attached to the mounting frame by a bearing. Further, a one way clutch is affixed between the pinion sprocket and the motor.

Still further, the target coupler (or target sprocket) may include a groove pattern disposed to mate a woven spoke pattern of the bicycle wheel, or simply mate with a hub positioned on the bicycle wheel.

Further, the pinion sprocket may engage the target sprocket (or second sprocket and third sprocket as appropriate, by either the target sprocket and driver each having a plurality of teeth suitable to be connected in power engagement a drive chain; or each having a plurality of gear teeth suitable to be engaged by one another, or each having a surface suitable to be engaged by a drive belt.

Furthermore, the electric motor may quickly be engaged or released from the mounting frame by a series of quick release tabs, together with connecting or disconnecting the motor shaft with a unitary power module shaft by using gears or spline connections.

According to the invention, a disk shaped member for an electric bicycle propulsion system preferably comprises a target sprocket comprising a disk shaped assembly having an center opening to allow target sprocket member to be placed about a wheel axle, and woven spoke pattern which allows the target sprocket to mate the woven spoke pattern of a wheel to enable the sprocket to be concentrically attached to the wheel outside the hub diameter by engagement by securing elements.

Further, a mounting frame for an electric bicycle propulsion system has a first and second opening disposed to receive an electric motor, and target sprocket, respectively. The target sprocket is securable to a bicycle wheel and securable to the mounting frame about a bearing affixed about the second opening.

As pointed out in greater detail below, the embodiments of this invention provides a number of significant advantages. For example, the key points of the invention include the establishment of a common reference or mounting frame and structure which assures precision alignment for the entire propulsion system under all conditions. This reference frame is formed by the disk or target sprocket along with the hollow extension collar and grooved surface. This disk provides a solid mounting attachment with the wheel through the grooved surface mating with the wheel hub and spokes. The disk is held concentric with the wheel hub, but great eccentricity accuracy is not required. The sprocket gear is attached to the reference frame disk through either a freewheeling clutch or directly attached to the reference frame disk. The motor mounting frame is attached to the reference frame disk through a bearing on the hollow extension collar of the disk. The motor is attached to the motor mounting frame, in such a way as to provide for proper meshing of the driven and target sprocket, independent of axle and hub bearing tolerances. The driver sprocket (or gear) is attached to the motor either directly, or through a one-way roller clutch, depending on whether the driven (or sprocket) gear has a freewheeling clutch. In this manner, the pinion sprocket, target sprocket and any intermediate gears are precisely aligned irrespective whether they are interconnected by a chain, a gear, or a belt. The motor mounting frame is clamped to the bicycle frame to prevent rotation of the mounting frame, i.e., to transmit propulsion torque to the bicycle.

The invention holds the entire propulsion system within the same reference frame, thereby constraining the propulsion system tolerances within the propulsion system. These tolerances are determined by the manufacturing tolerances of the propulsion system components as designed independent of the vehicle manufacturing tolerances. This allows the propulsion system to be applied to any vehicle, while maintaining the integrity and performance of the propulsion system. The invention itself, together with further objects and attendant advantages, will best be understood by reference to the following detailed description taken in conjunction with the accompanying drawings.

BRIEF DESCRIPTION OF THE DRAWINGS

FIGS. 6(a) and 6(b) are outside and inside side views of the mounting frame of the unitary power module of the present invention using a chain connection along with an electric motor, pinion gear sprocket, target sprocket and electrical connector.

FIG. 7 is an outside side perspective view of the mounting frame and target coupler of the unitary power module of the present invention mounted on a bicycle rear wheel FIG. 8 is an outside side perspective view of the unitary power module of the present invention using a chain connection mounted on a bicycle rear wheel.

FIG. 15 is a side elevational view of an electric bicycle of the present invention.

DETAILED DESCRIPTION OF THE INVENTION

Figure 1:
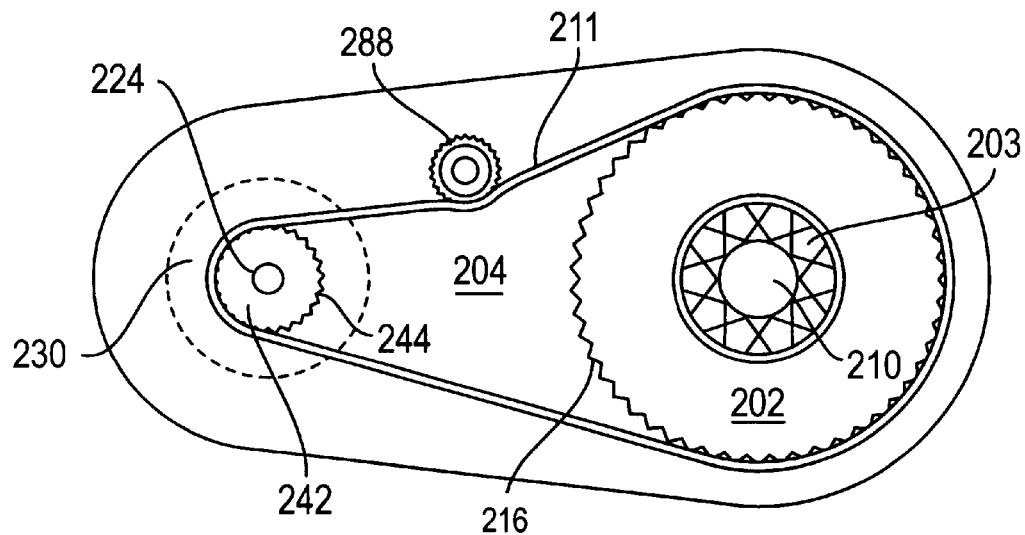
FIG. 1 is an inside side view of the present invention illustrating a preferred "chain-drive" embodiment of the unitary power module showing the mounting frame with the motor, pinion sprocket, chain and target sprocket.
Figure 2:
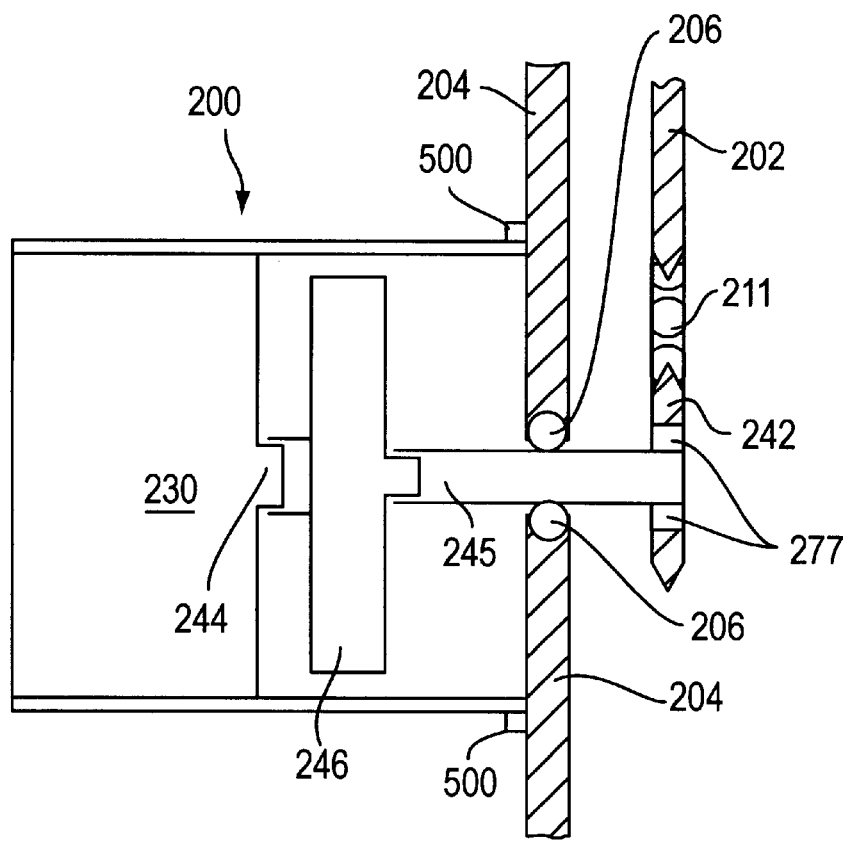
FIG. 2 is a illustrative cross sectional view of taken generally along the axis of the motor of FIG. 1.
Figure 3:
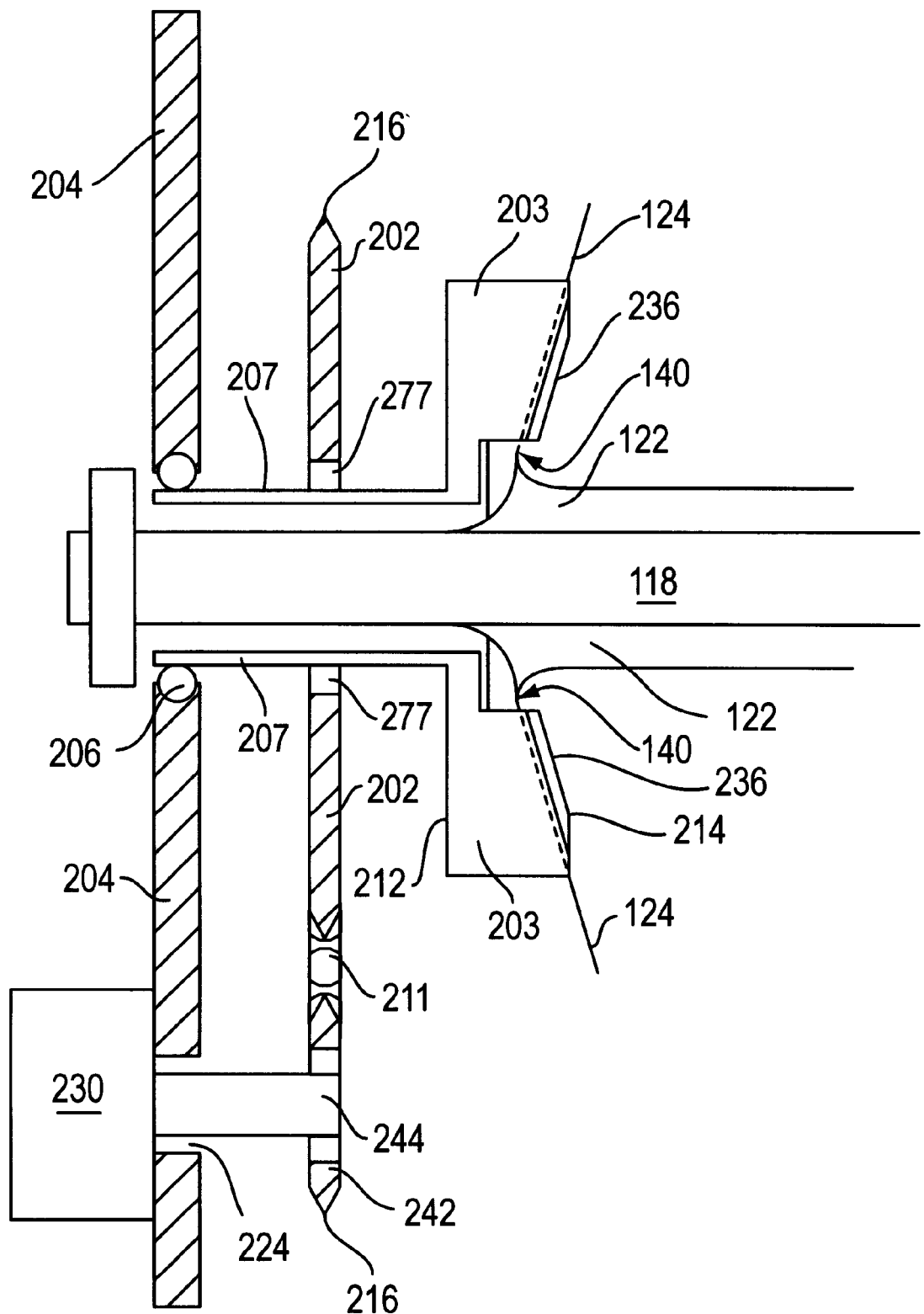
FIG. 3 is a cross sectional illustration view taken along the axis of the bicycle wheel showing a preferred embodiment of the mounting frame of the present invention mounted thereon.
Figure 19A:
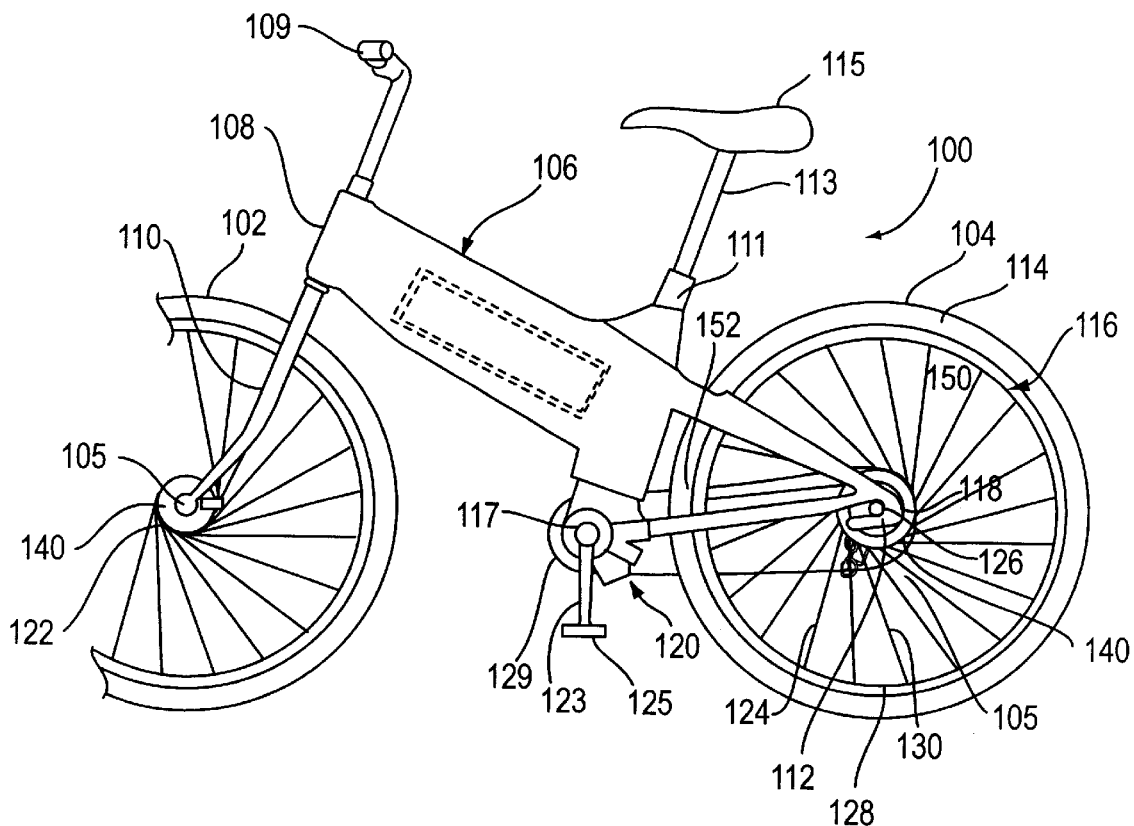
FIG. 19(a) is a side elevational view of a standard bicycle.
Figure 19B:
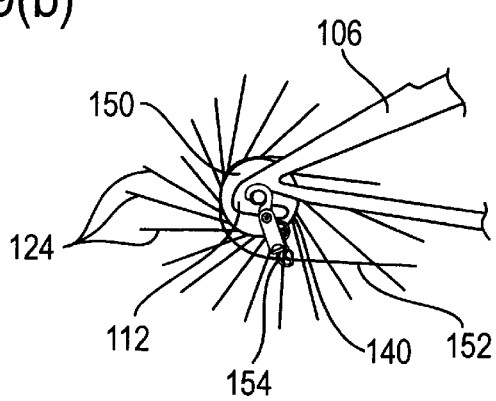
FIG. 19(b) is an enlarged view of the opposite side of the rear wheel of FIG. 19(b)

Referring now to FIGS. 1–3 a key aspect of the unitary power module 200 (or "unitary propulsion module") concerns the providing of a one frame of reference to align a pinion sprocket to a target sprocket. This is accomplished by using a "mounting frame" 204 of the unitary power module 200 to accurately align a pinion sprocket 242 of an electric motor 230 to the wheel/hub assembly 140 (shown in FIGS. 3 and 19). As all drive and target elements of the unitary power module are mounted to the mounting frame 204, a single integral and independent point of reference assures their proper alignment. The attachment of the mounting frame 204 to the hub/spoke assembly 140 (and to the bicycle frame) allows for a stable reference frame, since the wheel/hub assembly 140 is attached directly to the tire/rim assembly 128 of the wheel 104 (which is the target drive mechanism of the unitary power module 200). As described hereinafter, this reference frame eliminates the loose or varying tolerances of the wheel/hub assembly 140 and the tire/rim assembly 128 and the axle 118 and frame assembly 106, thereby providing rigid alignment of the drive and target elements of the unitary power module 200 even with the attendant shock and wear incumbent in such drive systems.

Turning now to FIG. 1, in one of the preferred embodiments of the invention, the mounting frame 204 is connected having a pinion sprocket 242 mounted thereon which is interconnected via a chain 276 to a target sprocket 202 via a target coupler 203 having a pattern 205 which matches the woven spoke pattern 130 of the bicycle wheel. An idler sprocket (or gear or pulley or "idler") 288 may be used to provide tension between a chain 211 to ensure engagement between the pinion sprocket 242 and the target sprocket 202. The idler 288 can also be used to allow the chain 211 to engage more teeth of the pinion sprocket 242 and thus permit closer spacing between the pinion sprocket 242 and the target sprocket. The mounting frame 204 when attached directly to the target sprocket 202 through a bearing 206, such a ring bearing, which allows the reference frame of the target sprocket 202 to freely rotate within acceptable tolerances while maintaining its mechanical attachment to the mounting frame 204. Further, the mounting frame 204 includes a motor opening 224 shown in FIGS. 2, 3 (or other mechanical element for attachment) for a motor 230 to be positioned thereon.

FIG. 2 illustrates the position of the motor 230 having a motor shaft 244 which engages a planetary gear 246 suitable for gear reduction, such as from 5:1 or 7:1 RPM reduction. By use of a this important configuration, the planetary gear reduction system between the motor shaft 244 and pinion sprocket 242 enables the user to select the preferred overall RPM ratio between motor and bicycle wheel, which can be adjusted over a wide range of high values. The planetary gear 246 in turn engages the pinion sprocket 242, which is interconnected by a chain to the target sprocket. This simple configuration will be the least cost of certain applications. The overall reduction ratio between the RPM of the motor 230 and the RPM of bicycle wheel 104 is easily adjusted by the ratio of diameters or number of teeth between the pinion sprocket 242 and target sprocket 202. A quick-disconnect 500 for the motor 230 is provided by providing a spline 245 on the motor shaft 244 attaching to the input of the planetary gear system 246. Of course, in a still simpler configuration the planetary gear reduction is not needed. For example, the motor 230 may connect directly to the pinion sprocket and the overall RPM ration between the motor 203 and the drive wheel 104 is smaller. In this case, a lower RPM motor is necessary.

As further illustrated in FIG. 3, the mounting frame 204 receives the motor 230 having its motor shaft 244 perpendicular to mounting frame 204. Through the mechanism such as illustrated in FIG. 1, the motor 230 is suitable to provide power to the pinion sprocket 242. The target sprocket 202 is affixed to a hollow extension collar (or rotating tube) 207 or the like, which is interconnected a target coupler 203, which engages the spokes 124 of the bicycle wheel 104 about the hub 122 but mounts to the spokes 124 outside of the hub 122. The target coupler 203 has the same wheel spoke pattern 205, as shown in FIG. 5(c), to mate the wheel spoke pattern 205 of the bicycle wheel 104 shown in FIG. 8 and is affixed thereto as further illustrated in FIG. 8. The inner diameter of this whole assembly is made large enough to fit over virtually all types of hubs 122. The coupler fastens to the spokes and spreads the torque across typically 16 or 18 spokes at their strongest point. This target coupler 203 is rigidly connected to (or part of) the rotating tube 207, which can rotate with respect to the mounting frame 204 because of the ring bearing 206. Thus, as described, the invention provided a common point of reference for the various components of the direct drive system, which allows tolerances to be controlled within the propulsion drive system, as well as isolated from the tolerances of the bicycle components. Merely by way of example, the target sprocket 202 and target coupler 203 (or "criss-cross coupler") may be constructed of either aluminum or engineered plastic which can be molded, and the mounting frame 204 is preferably aluminum, both for light weight and relatively high thermal conductivity for the purpose of dissipating motor heat.

As pointed out above, the target sprocket 202, which preferably is driven by a chain 211 from the pinion sprocket 242. It is mounted through a freewheeling clutch 277 proximate to the rotating tube 207. The free wheel clutch allows the wheel to spin freely without the drag of the electric motor 230, when the electric motor is not being powered. This free wheel clutch 277 significantly reduces wheel drag, a discernable effect to the bicycle rider, and improves the range of the bicycle. The free wheel clutch 277 can be implemented as a roller clutch or "freewheel" on the pinion sprocket gear or as a free wheel clutch on the target sprocket. In this manner, when the target sprocket rotates faster than the rear wheel, it engages and drives the wheel. When coasting with the motor off, the free-wheel allows the rear wheel to rotate with the target sprocket 202 disengaged.

A suitable "freewheel" or "one-way roller" clutches which may be incorporated into the unitary power module 200 is made of Dicta Brand Freewheel manufactured by Lida Machinery Co., Ltd., Taiwan, and is a freewheel which employs pawls in the clutch. It is positioned in the target sprocket, which drives the rear wheel. It is incorporated into the gear or sprocket and is concentric with the wheel axle as part of the mechanism. Another suitable unit is a roller clutch made by Torrington, Inc. of Connecticut which can be incorporated on the intermediate shaft on which is mounted two sprockets in the two-stage gear reduction configuration. As described hereinafter, there are several methods for implementing a one-way clutch feature for the propulsion system, e.g., one possible way would be to put a roller clutch between the motor and pinion gear. An alternate mechanization would be to put a freewheeling clutch between the wheel and the target sprocket or gear. If the freewheeling clutch is placed between the wheel and driven gear, then the freewheeling clutch would attach to the hollow extension collar of the reference frame disk already described. Otherwise, if a one-way clutch is implemented between the motor and pinion gear the driven gear would be directly and firmly attached to the disk and hollow extension collar.

As illustrated, a ring bearing 206 allows the mounting frame to rotate around a tube, which can rotate. The rotating tube 207 is rigidly attached to the target coupler 203 (or spoke coupler or target coupler, which as illustrated is a disk shaped member which is circular with the tube 207 (or a hollow collar) in the center. The bearing 206 attaches to and interconnects the target sprocket 202 having the hollow collar 207 at a centrally positioned opening 208 of the target sprocket 202 and an opening 210 of the mounting frame 204, which are concentric to one another. The target coupler 203 that drives the bicycle wheel is a disk shaped member having the central opening 208 and an outside and inside surface 212, 214. In this embodiment, the target sprocket 202 includes a plurality of chain teeth 216 suitable to engage the chain 211. The hollow collar 207 allows clearance of the axle of the wheel 104. The free-wheel clutch (or "free wheel") can also be mounted as before described or either on the target sprocket-coupler mechanism or the output shaft of the planetary gears 246.

Figure 14:
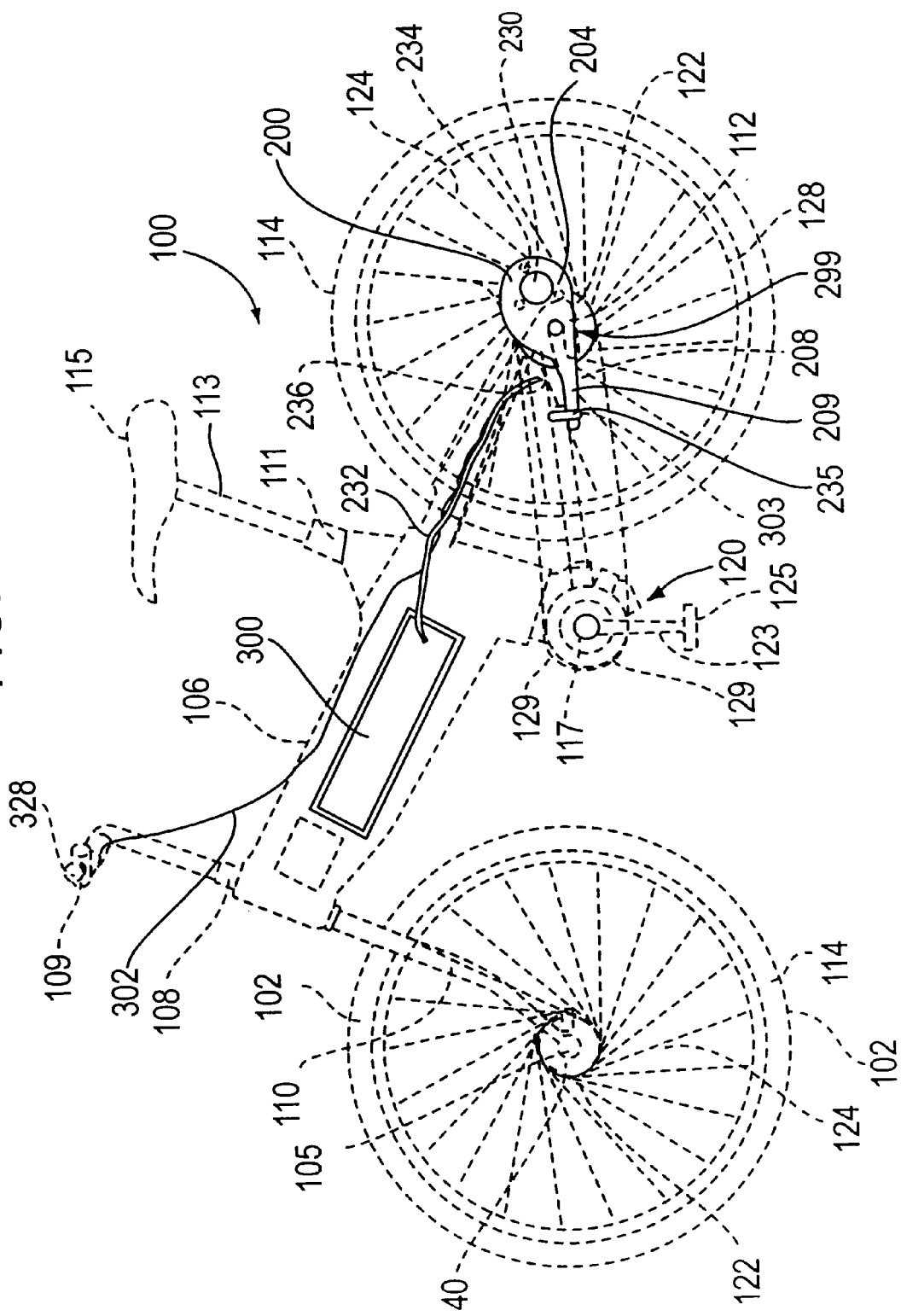
FIG. 14 is a side elevational view of a propulsion system kit for an electric bicycle of the present invention shown in solid lines, with the existing bicycle illustrated in shadow lines.

The target sprocket 202 is mounted about the rotating tube 207 by the freewheeling ("free wheel") or the one-way clutch 277. The free-wheel 277 can be mounted on the motor shaft 244 between the pinion sprocket 242 and the motor shaft 244. As illustrated, when the motor 230 is off and the shaft is stationary, the pinion sprocket 242 can rotate along with the chain 211. The rotating tube 207 is precisely mounted to the mounting frame 204 by a ring bearing 206 or the like concentric with the rear axle. The mounting frame 204 is mounted to the bicycle frame 106 by suitable securing elements 235, as shown in FIGS. 14, 15. For example, as may be understood from FIGS. 14 and 15, the quick disconnect (or "quick-disconnect clamp") may affix the mounting frame 204 to the bicycle frame 106 (via either the horizontal or diagonal rear stays 112) in lieu of securing element 235. In this manner, the torque from the propulsion system is transmitted to the rear wheels, which of course, eliminates any rotation between the mounting frame 204 and the bicycle frame 106. When the motor 230 is off, the target sprocket 202 is stationary and the tube-coupler-bicycle wheel can rotate because of the action of the free-wheel 277. When the motor 230 is on, i.e., the target sprocket 202 is rotating faster than the coupler-bicycle wheel, the free wheel 277 engages and the target sprocket 202 drives the tube-coupler-bicycle wheel assembly.

As described in FIGS. 1–3, the entire unitary power module 200 is totally independent of the bicycle per se as it can be operated by itself, e.g., on a bench. The mounting frame provides and maintains rigid alignment of the complete propulsion module independent of bicycle-hub-axle tolerances. The unitary power module, when attached to the spokes, can even be somewhat off-center with respect to the axle with little noticeable effect. Further, as shown in FIGS. 14 and 15, the unitary power module 200 may be attached to the frame by the quick-disconnect 234 to assure easy repair or replacement of a tire or the module itself.

Figure 4A:
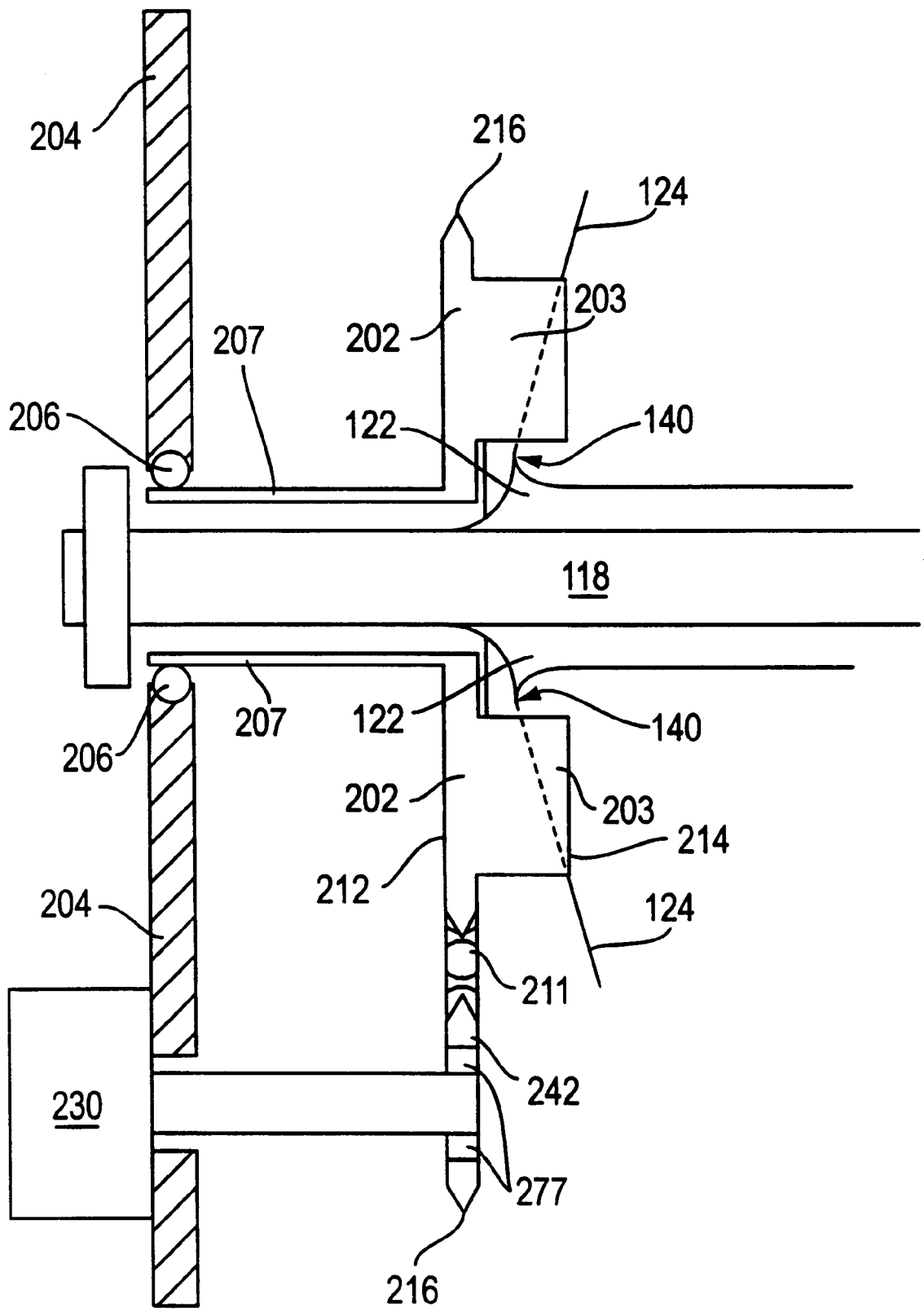
FIGS. 4(a) and 4(b) are cross sectional illustration view taken along the axis of the bicycle wheel showing the mounting frame of other embodiments of the present invention mounted thereon.
Figure 4B:
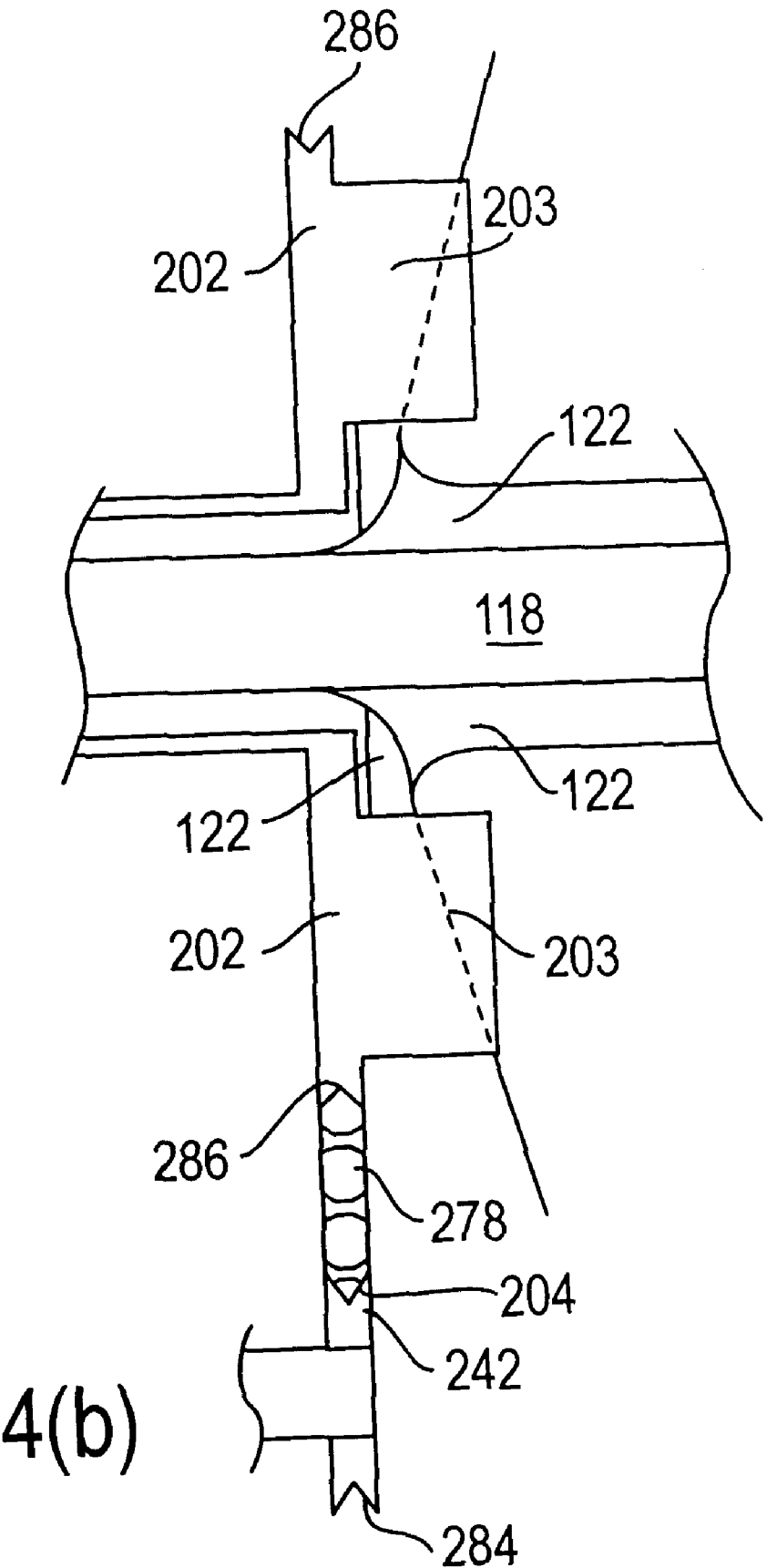

Turning now to FIGS. 4(*a*) and (*b*), the invention may be practiced when the target coupler 203 and target sprocket 202 are formed in an integral unit. Further as illustrated in FIG. 4(*b*), a belt 278, such as a "V" belt 278 may be used rather than a chain to interconnect the pinion sprocket 242 and target sprocket 202. As illustrated, a "V" groove 284 is formed in both the pinion sprocket 242 and target sprocket 202 (and idler sprocket 288) to receive the "V" belt. Similarly, the target sprocket 202 defines a similar surface groove 286 to receive a "V" belt 278 or the like. Other forms of belt configurations may readily be used by modifying the pinion sprocket 242 and target sprocket 204 to receive such belts 278.

Figure 5A:
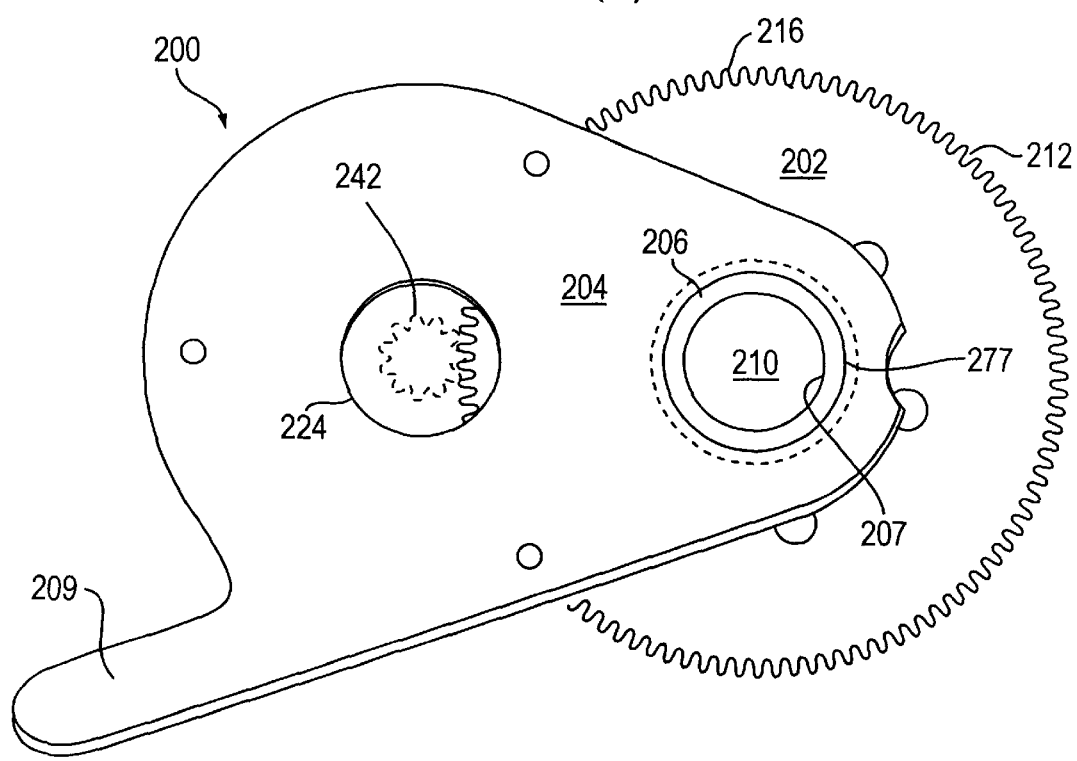
FIGS. 5(a) and 5(b) are outside and inside side views of the mounting frame of the unitary power module of the present invention using a gear connection without the motor mounted thereon.
Figure 5B:
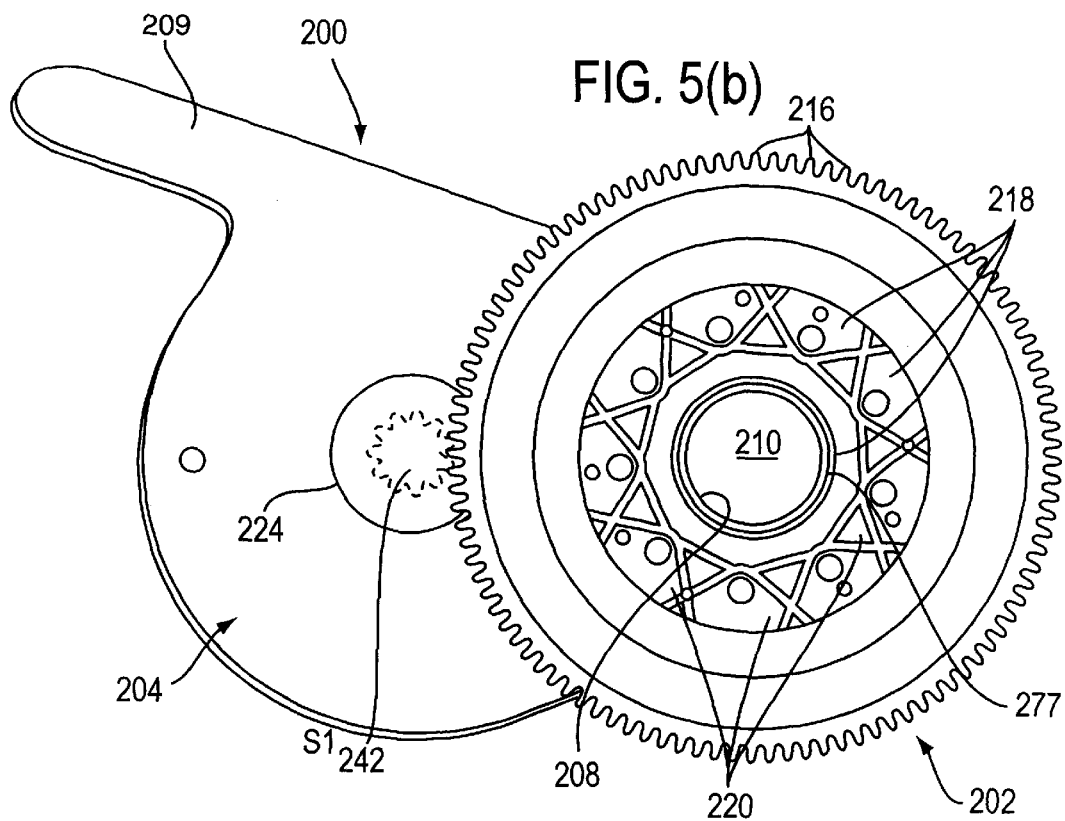
Figure 5C:
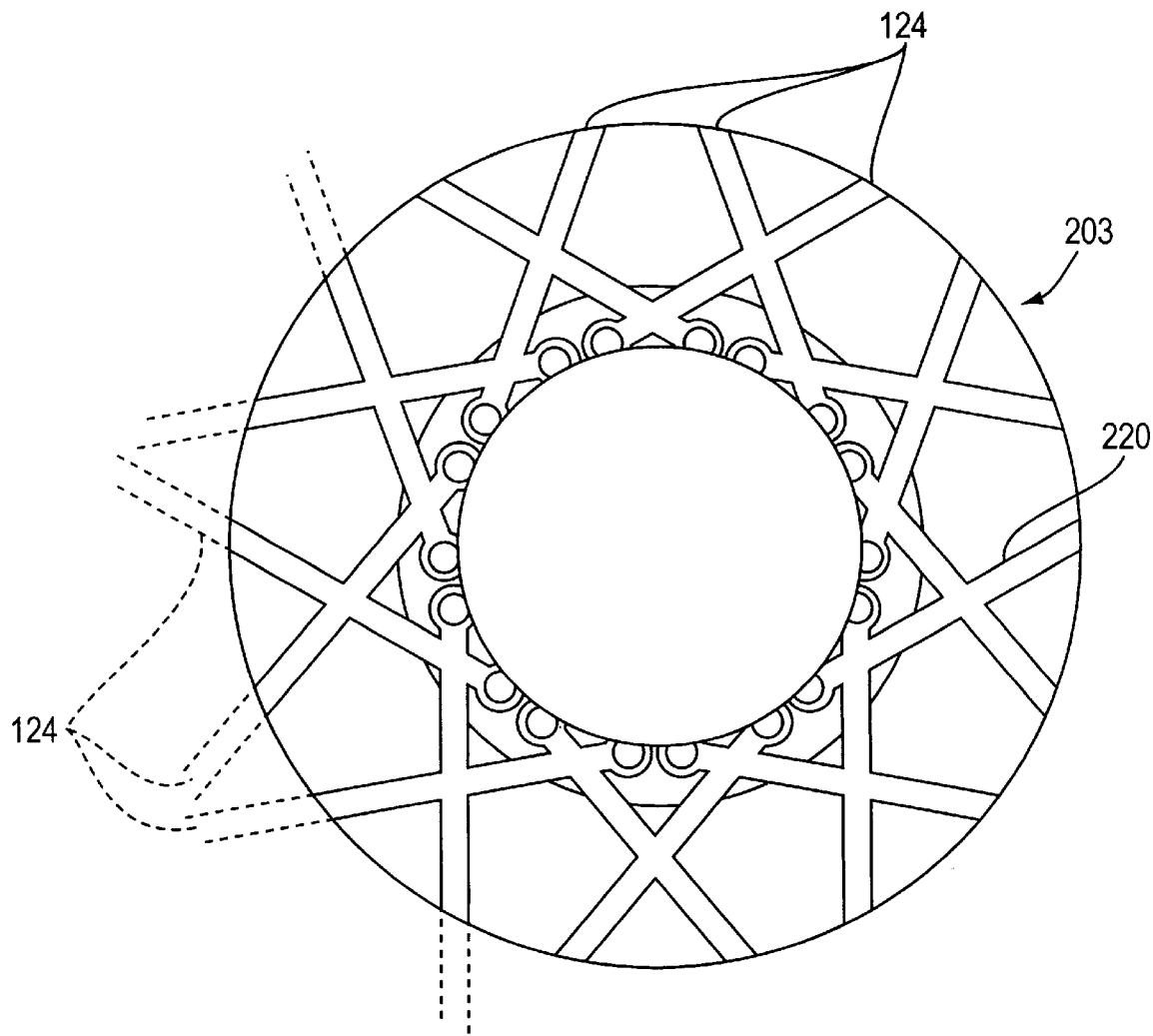
FIG. 5(c) is an enlarged view of the annular target coupler pattern suitable to engage the 36 spoke 3 cross wheel pattern of a bicycle wheel.

Merely by way of illustration, FIGS. 5(*a*) and 5(*b*) show another embodiment of the unitary power module 200 suitable for using meshed gears (with the pinion gear in phantom lines) when viewed from the "outside" and outside of the bicycle 100. Meshed gears, in contrast to a chain and sprocket, have the advantage of being very compact and may function very well with this rigid alignment concept of the mounting frame 204. In this embodiment, the pinion sprocket 242 (shown in a phantom line) or pinion pulley must be located closer radially towards the axle hole so that appropriate engagement is maintained between a pinion gear and the target sprocket. Also, the motor rotates in the opposite direction to that for the chain drive. As described, the mounting frame 204 and target sprocket 202, which are aligned together with a free wheel clutch 277 placed therebetween. The mounting frame 204 is mounted to the target sprocket 202, though an opening 210 in the mounting frame 204, by way of an attachment to a hollow extension tube 207 or collar 207 ("tube 207") of the target sprocket 202, which is mounted to the bicycle wheel 104, as described below. An projection 209 may be formed on the mounting plate 204 to secure the mounting plate 204 via a clamp or the like to the frame assembly (not shown).

Turning to FIG. 5(*b*), the inside surface 214 of the other side of the target sprocket 202 includes an annular region 218 positioned generally concentric on the target sprocket opening 208. The annular region 218 includes a plurality of crossed slots 220, which fit the spoke pattern of a standard bicycle wheel (e.g., such as the common configuration of 36 spokes or 34 spokes, half on each end of hub 122). A plurality of tapped holes 222 are spaced around the positioned around the annular region 218 which serve the purpose of receiving screws (not shown) to fasten the target coupler 203 to the wheel spokes 124. Alternatively, studs (not shown) may take the place of holes which match a plate (not shown, but illustrated in FIGS. 6((*b*)). The mounting frame 204 defines a second opening 224 to receive an electric motor (not shown). As illustrated in phantom lines, the pinion sprocket 242 (S1) is positioned to engage the target sprocket 202. An enlarged view of the annular target coupler pattern suitable to engage the spokes 124 of a 36 spoke 3 cross wheel pattern of a bicycle wheel is shown in FIG. 5(*c*). As illustrated, the target coupler 203 includes crossed slots 224 are formed to receive the spokes 124 of the bicycle wheel thereby providing a firm mechanical coupling of the target coupler 203 to the bicycle wheel (not shown).

While FIGS. 5(*a*) and 5(*b*) illustrate a meshed gear drive system, a chain drive system as described above would involve only moving the pinion sprocket away from the sprocket 202 and use teeth rather that the gears on the target sprocket 202. As described above, the motor in a chain drive would rotate the opposite direction than a meshed gear drive to impart the same rotational direction to the bicycle wheel.

As illustrated in FIG. 6(*a*), the unitary power module 200 having an electric motor (or motor) 230 as it would look from "outside" of the bicycle wheel if it were attached to the wheel (not shown). A suitable electric motor 230 for use with this invention is a brushless dc motor having a R.P.M. operational speed from about 3000 R.P.M. to about 4000 R.P.M. along with integral control electronics. Brush motors of a wide variety can also be used. Other motors with a wide range of operational RPM's can be employed with the various reduction mechanisms taught herein. The motor 230 has an electrical cable 232 suitable to plug into a module connector 231 for interconnection to a battery (not shown). As illustrated above, the target sprocket 202 is mounted on the mounting frame 204 in the second opening 224 provided therein. The large diameter of the opening 210 in the mounting frame 204 is suitable for it to slip over the entire wheel/hub assembly 140. The motor 230 may be quickly attached to the mounting frame 204 by quick release tabs 234, and may quickly removed by rotation of the tabs 234 or other similar quick disconnect fasteners. As illustrated, the pinion sprocket 242 is coupled by the chain 211 with the target sprocket 202 .

Figure 6B:
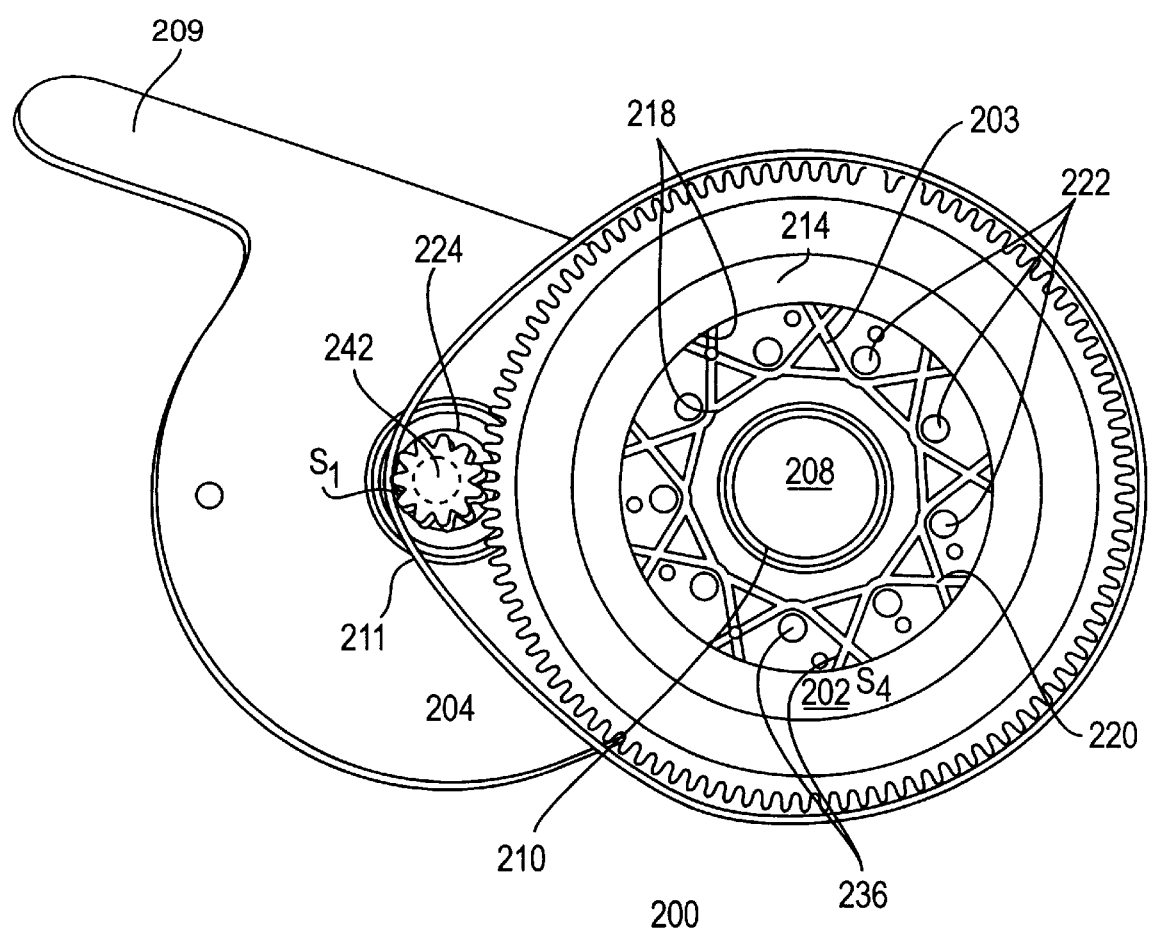

In this manner, the motor 230 can be quickly removed or replaced merely by releasing the tabs 234 and disconnect the electrical cable 232 from the module connector 231 within the motor 230. Turning now to FIG. 6(b), the target sprocket 202 is mounted on the opposite side of the mounting frame 204 from the motor side. Since this is an integral "unitary power module," the pinion sprocket 242 ("S1") and target sprocket 204 (or "S4") remain perfectly meshed or aligned with each other whether or not the module is exactly concentrically attached to the bicycle wheel 104 and independent of any loose tolerances and changing tolerances of the hub or bearings.

Furthermore, in cases where the bicycle wheel is warped or otherwise in less that a planar configuration, the alignment of the chain between the pinion sprocket 242 and target sprocket is accurately maintained. FIG. 6(b) also shows illustrates the use of the mounting ring 236 (shown in phantom lines) to secure the target coupler 203 to the bicycle wheel hub 122. The inside surface 214 of the other side of the target coupler 203 includes an annular region 218 which is concentric with the target sprocket opening 208. The annular region having has crossed slots 220 which fit the spoke pattern 130 of a standard bicycle wheel (not shown). The holes 222 are positioned in the annular region 218. The crossed slots 220 fit the spoke pattern 130 of the bicycle wheel, such as the rear wheel of FIG. 19.

As shown in FIG. 7, the target module 204 in combination with the target sprocket 202 having the target coupler 203 (shown in phantom lines) engaging a thirty-six spoke, three cross wheel pattern of a bicycle wheel. A suitable material for construction of the target coupler 203 would be A1 6061 having a black anodize or the like, or it could be made of a plastic along with molded metal thread inserts. By precisely integrating the woven pattern 130 of a spoke wheel, the target coupler 203 provides a rugged construction suitable to receive the torque loads imposed upon the target sprocket 202.

Turning now to FIG. 8, the unitary power module 200, with a motor 230 and pinion sprocket 242 using the chain 211 to drive the target sprocket 202, is shown in an "outside" side view attached to a bicycle wheel 104. The bicycle wheel 104 includes an axle 118, a hub 122, a plurality of spokes 124 positioned about the axle 118 (as further illustrated in FIGS. 16(a)(b)(c)), and connecting to the tire/rim assembly 124. The mounting frame 204 and target sprocket 202 are mounted around the axle 118 though the target sprocket opening 208 and plate opening 210 respectively on the target sprocket 202 and mounting frame 204. As illustrated above, the unitary power module 200 includes a plurality of quick-release fittings, such as the tabs 234, the motor 230 can be quickly detached from the mounting frame. When re-engaged, accurate gear alignment is automatically established. This feature provides significant advantages, as it is useful both for easy repairs (replacement) and for converting the bicycle back and forth between electric and conventional configurations. Also, a one-way roller clutch 240 can either be concentric with the target sprocket 202 and bearing 206 or it can be attached to a pinion sprocket 242 on the motor. As is apparent, this is a complete propulsion module or "kit" to convert a bicycle into an electric bicycle. That is, if voltage is applied to the motor, the motor can drive the pinion sprocket, which in turn can drive the larger target sprocket 202, and it works as a unitary self-contained module. Further, this unitary power module 200 can be attached to the outer diameter of the bicycle wheel hub 122. The mounting frame 204 is easily rotated around the wheel axle for any position to attach to the frame 106 which does not interfere with the bicycle frame stays 112.

Figure 9:
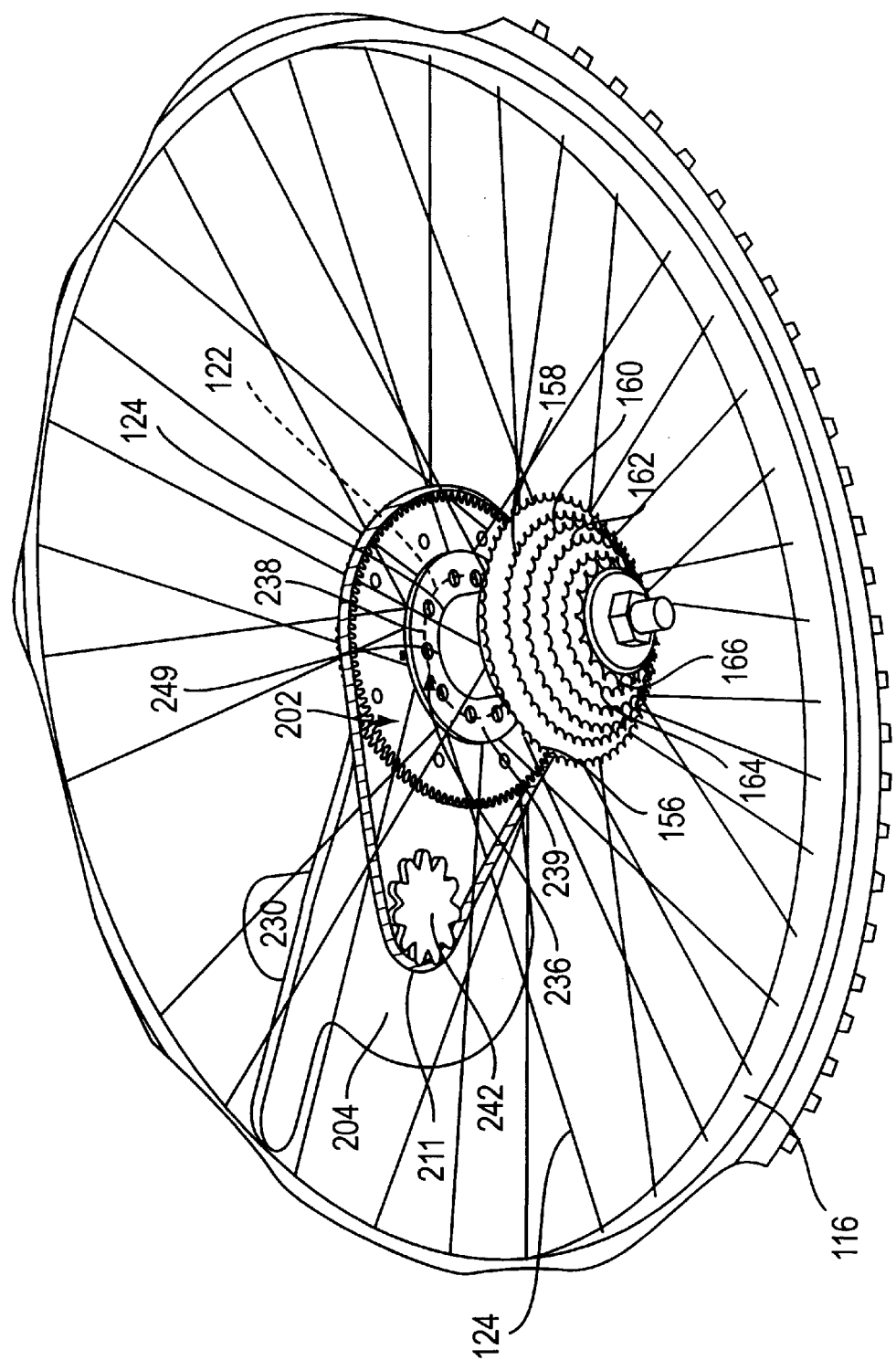
FIG. 9 is an inside side prospective view of the unitary power module using a pinion sprocket and target sprocket using a chain connection attached to the rear wheel of bicycle.

As illustrated from the "inside" perspective in FIG. 9, the unitary power module 200 with the motor 230 and pinion sprocket 242, is mounted to the bicycle wheel 104, with the spokes 124 and the hub 122 by a mounting ring 236. Merely for illustration, the "inside" shows a derailleur gear cluster 156, having a plurality of sprockets 156, 158, 160, 162, 164, and 166 suitable for manual gear adjustment. As described above, FIG. 9 shows the attachment of the target coupler 203 (or target sprocket 202) connected or meshed with bicycle wheel 104 in the following manner. The mounting ring 236 formed by two semi-circular pieces 238,239 fits flush against the target sprocket 202 and secures it to be positioned to receive the spokes 124. A plurality of screws 249 (or bolts where the holes 222 are replaced with studs) or the like, extend through the wheel spokes 124 then secure the target sprocket 202 as a unit to the bicycle wheel 104. As a result the target sprocket 202 attaches firmly and precisely with the wheel/hub assembly of the wheel 104. The target sprocket 202 through virtue of the grooves holds precisely to the wheel 104, maintaining concentricity with the wheel/hub assembly, although perfect concentricity is not required. In this manner, the target sprocket 202 can rigidly be mounted to the spokes 124 of a bicycle wheel 104. The mounting ring 236 includes a plurality of holes 270 which mate to the holes 222 of the annular region 218 of the target sprocket 202, as shown in FIG. 5.

It is important to recognize that the unitary power module 200 is automatically centered to reasonable and practical tolerances on the axle of the bicycle 100 to a fairly close tolerance. Perfect centering is not required for perfect pinion-driven gear alignment, which is independently maintained on the unitary self-contained module. It is important to note that the plate opening 210 in the mounting frame is much larger than the wheel axle and hub diameter. Thus, the whole unit can be rotated around the axle for a convenient angular position with respect to the members of the bicycle frame 106. The mounting frame 204 is then connected to the frame by a strap or pin 235, as shown in FIG. 14 or a quick-disconnect clamp such a "C" clamp (not shown). This is necessary to hold the position of the unit with respect to the frame 106 and to transfer the torque to the frame. As this connection can be the quick disconnect clamp, it facilitates rapid disconnection of module 200 from the frame 106 and rapid wheel/tire repair.

Figure 10A:
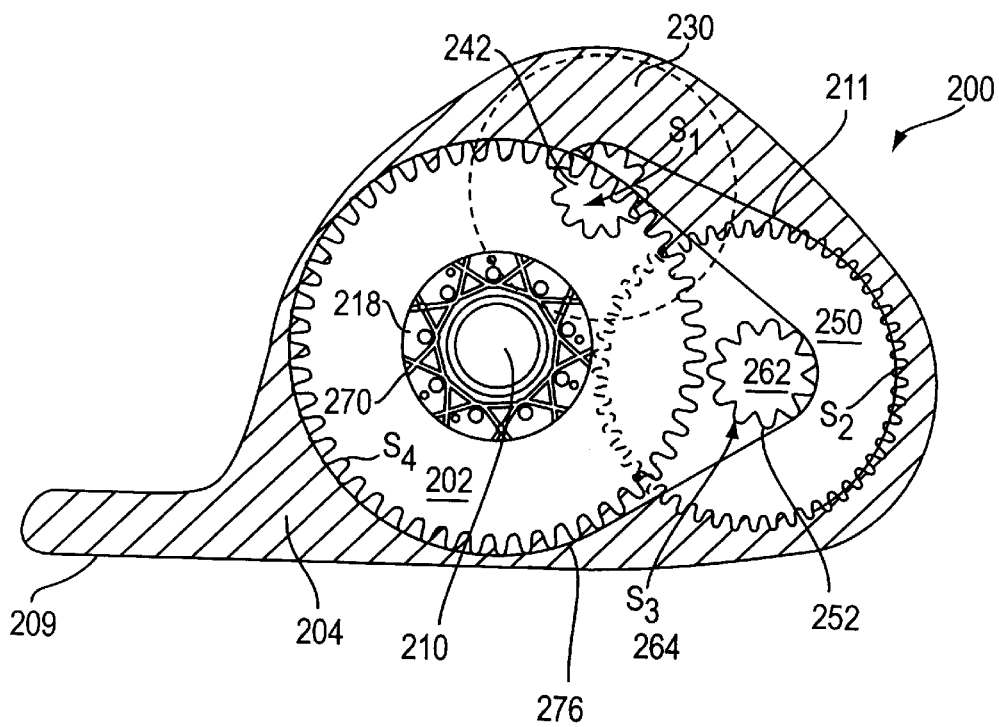
FIGS. 10(a) and 10(b) are cross-sectional views of other preferred embodiments of the unitary power module using a second sprocket and shaft used to achieve reduction in motor Revolutions per Minute ("RPM").
Figure 10B:
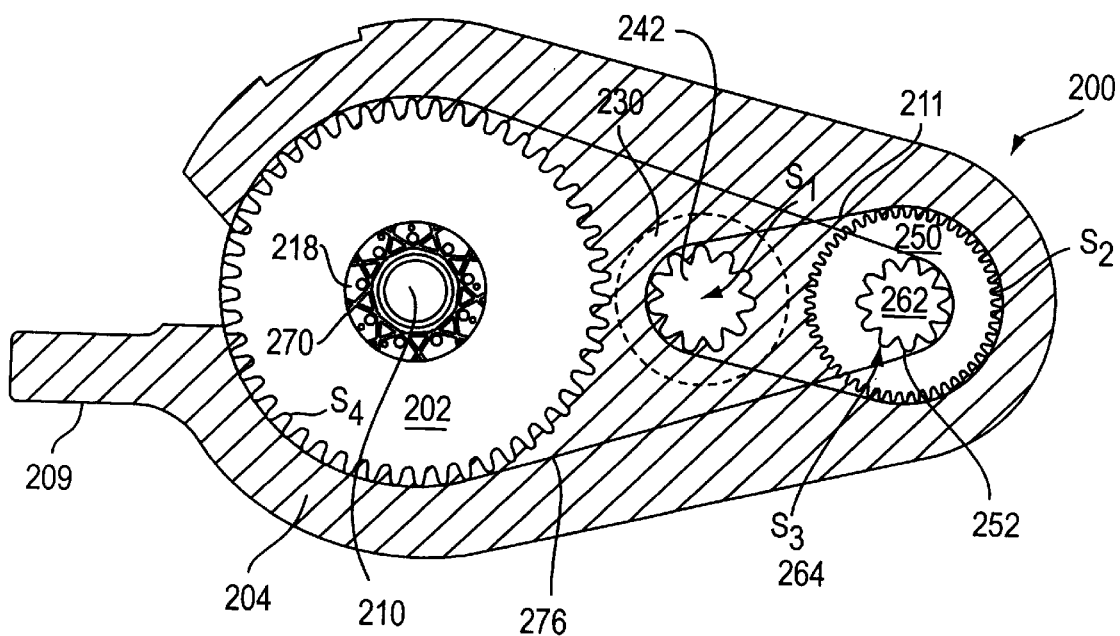
Figure 11:
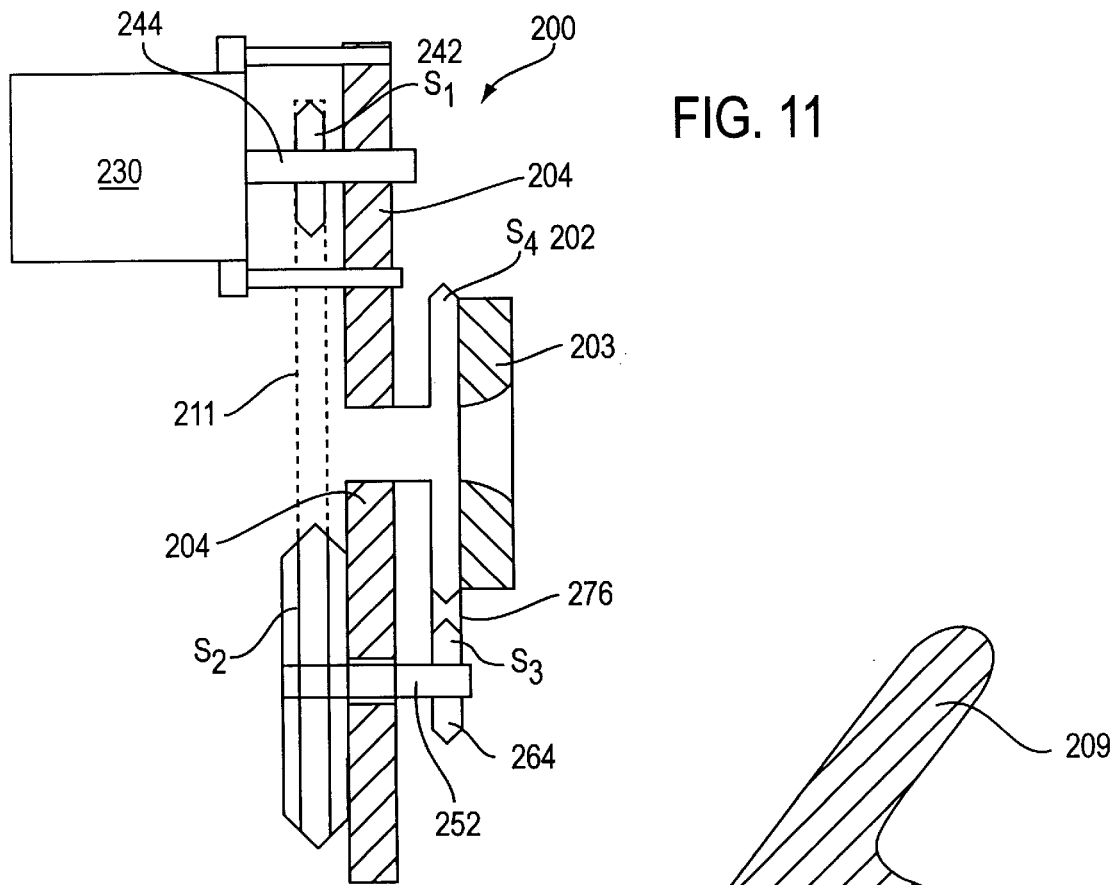
FIG. 11 is an illustrative side view partially in cross-section of the unitary power module of FIG. 10(a).

Turning now to FIGS. 10(a), 10(b) and 11, another preferred embodiment of the unitary power module of the present invention is illustrated. In this embodiment, unitary power module includes a the target sprocket 202 ("S4") defining a disk shaped member having a center opening 210 to allow the target sprocket 202 to be placed about the wheel axle 118 of the bicycle. As before, the target sprocket 202 mates with a bicycle wheel 104 to enable the target sprocket 202 to be substantially concentrically attached to the wheel by engagement the woven spoke pattern 130 by the target coupler 203 and the securing elements as described above. The mounting frame 204 is aligned with and rotatably attached to the target sprocket 202 to allow for rotation of the target sprocket 202 ("S4") about the wheel axle 118. The mounting frame 204 has an opening 224 to receive an electric motor 230 to enable a pinion sprocket 242 ("S1") affixed via motor shaft 244 of the motor 230 to engage a second sprocket 250 ("S2") via the chain 211. The mounting frame 204 includes the projection 209 which enables the mounting frame 204 to be secured to the frame. The second sprocket S2 is mounted by a second shaft 252 positioned on the mounting frame 204, is aligned with the pinion sprocket 242. The third sprocket 264 ("S3") is also mounted on the same second shaft 252 as sprocket S2, and is aligned with the target sprocket 202. The third sprocket S3 is positioned to engage the target sprocket 202, such as via the chain 276, and rotate target sprocket 202 thus rotating bicycle wheel 104.

In this "2-chain" embodiment there are two sprockets, S2 and S3 mounted on an intermediate shaft. The motor drives pinion sprocket 242 (S1) through the first chain 211. Sprocket S2, which is usually larger than S1, in turn drives by S3 and the final target sprocket 202 (S4) by a second chain 276. While the sprockets S1, S2 are on one side of the mounting frame 204, and sprockets S3 and S4 are illustrated on the other side of the mounting frame, the pair of sprockets S1, S2 and S3 and S4 can be in various positions in regard to the mounting frame 204, e.g., S1 and S2 may be on the same side of the mounting frame 204 with S3 and S4. By use of the two chain drives, the overall gear ratio can easily be adjusted by chain the number of teeth on S-1, S-2 (or the other sprockets). Also, in a like manner, two or more belt drive systems may also be used. Accordingly, this can provide great flexibility and compactness as different motors having different costs, RPM's, etc., can be easily adapted as the power sources. As described, it is apparent that this configuration is elegant and very compact. Also, in this case, the free-wheel 277 can either be mounted concentric with the axle between the target sprocket 202 and coupler 203 or, e.g., on the intermediate shaft between S-1 and S-2.

Figure 12:
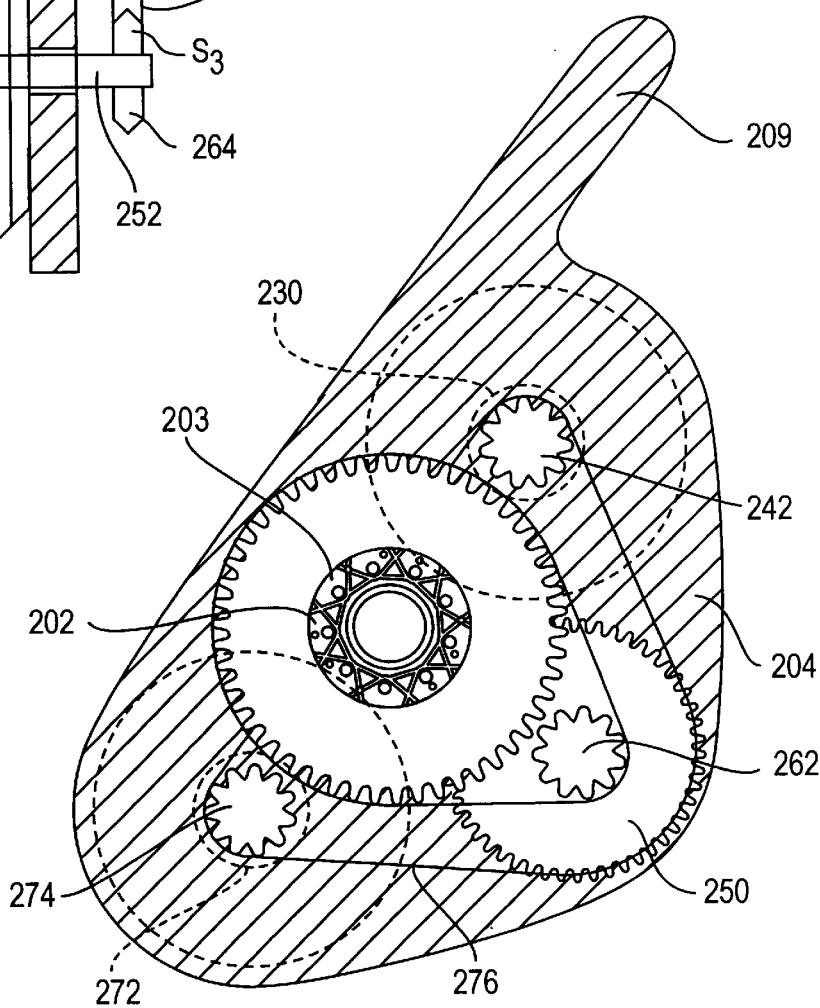
FIG. 12 is another embodiment of a unitary power module having first and second motors with pinion gears to provide power to the unitary power module.

In another embodiment of the invention, as illustrated in FIG. 12, the mounting frame 204 additionally may include a second opening 270 (not illustrated) suitable to receive a second electric motor 272 having a second pinion sprocket 274. The second pinion sprocket 274 can be connected to the pinion sprocket 242 in a manner that target sprocket 202 is driven by both electric motors 230, 272. For example, the pinion sprocket 242 and the second pinion sprocket 274 are connectable and aligned together by a chain 276 to provide rotational power to the target sprocket. Also, one of the motors 230 may include a one-way roller clutch 240 and the other electrical motor 272 may include a roller clutch. In this manner, one motor can be shut off while the other motor is operating for level riding, however, for steeper grades the second motor can be switched on to effectively double the available power to the target sprocket and the bicycle wheel. As understood, one or more independent integral propulsion modules can be mounted to a bicycle, thus providing optimum performance of torque and efficiency at relatively low RPM. For a given driven drive gear (or sprocket) of modest diameter necessary to keep the module reasonably small overall, the overall speed reduction of the motor RPM.

Figure 13:
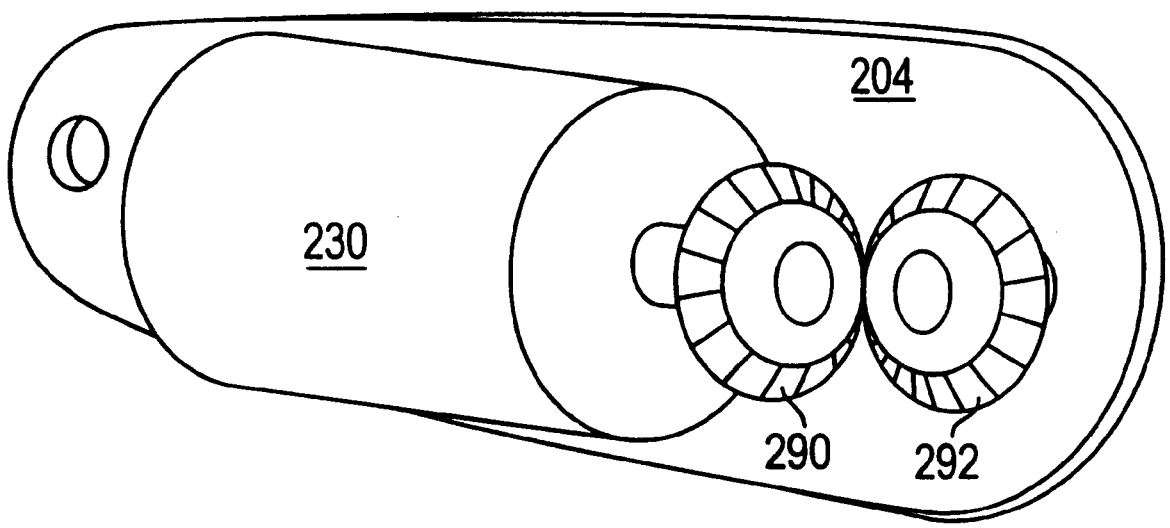
FIG. 13 illustrates an alternative embodiment of mounting a motor on a mounting frame using a bevel gear.

In another embodiment of the invention shown in FIGS. 13, the motor 230 is mounted on mounting frame 204 in a parallel (or horizontal) position to major axis of the mounting frame 202. By use of a pair of bevel gears 290, 292, power from the motor 230 is supplied to the target sprocket. By use of this configuration, a cylindrical motor 230 whose axis is parallel to the plane of the mounting frame may be used. The bevel gears 290, 292 which transmit rotation of a shaft parallel to the mounting frame to a shaft perpendicular to the plate, can work reliably with shock and vibration because of the rigid "unitary" assembly. All other propulsion elements are the same. This provides additional ability to adapt to longer cylindrical motors rather than pancake designs. In this manner, the breadth of the motor projection can be minimized and another motor having an extended cylindrical shape can be used without having the motor projecting a substantial horizontal distance.

Another embodiment of invention is shown in FIG. 14, which illustrates a kit 299 for converting a standard bicycle (shown in phantom lines) to an electric bicycle, which is easily connected and disconnected from any bicycle. It permits simple dropping of the rear wheel for wheel and tire repair. By use of this kit, the unitary power module can be easily mounted or attached to the outside diameter ("O.D.") of a bicycle wheel hub, fitting virtually any bicycle and transforming it quickly into a high-performance electric bicycle. In more detail, the propulsion system kit is provided for converting a standard bicycle having a frame 106 and the front wheel 102 and the rear wheel 104, with the rear wheel 104 having an axle 118 and hub 122 together with a wheel pattern (or woven pattern) 130 into an electric bicycle. The kit 299 comprises a battery 300 suitable to be affixed to the bicycle 100, an electric motor 230 having a pinion sprocket gear 242 affixed thereon, with the electric motor 230 suitable to be connected to the battery 300 by a battery cable 232. Propulsion controls 328 are attached to the handlebars 109 for speed control. These components together with the above unitary member 200, and all of the above described components comprises the "kit." which can convert any standard bicycle into a high performance electric bicycle.

Also, as illustrated in FIG. 14 (and FIGS. 6(a),(b), and FIG. 8 above), the kit 299 provides the components of the unitary power module 200, including the electric motor 230 which attaches to the mounting frame 204. The attachment of the motor 230 allows for the pinion gear 242 to properly mesh with the target sprocket 202 affixed to wheel of any standard bicycle by the target coupler 203, independent of axle bearing and hub bearing tolerances. A mounting frame clamp 235 is attached to the projection 209 of motor mounting frame 204, to prevent the motor 230 and mounting frame 204 from rotating about the frame assembly 106 and thus provide a stable mounting point for the unitary power module. Alternatively, the clamp 235 may be replaced with the quick disconnect element previously suggested (such as quick disconnect 234 shown in FIGS. 18(a), (b) and (c)) so that entire rear wheel/unitary power module wheel can be rapidly dropped for tire/wheel repair. This quick disconnect is similar to the quick disconnect fitting which clamps the bicycle wheels to the dropouts on the bicycle frame.

As illustrated above, the unitary power module 200 includes a plurality of quick-release fittings such as the tabs 234, the motor 230 can be quickly detached from the mounting frame. When re-engaged, accurate gear alignment is automatically established. This feature provides significant advantages, as it is useful both for easy repairs (replacement) and for converting the bicycle back and forth between electric and conventional configurations. Also, a one-way roller clutch 240 can either be concentric with the target sprocket 202 and bearing 206 or it can be attached to a pinion sprocket 242 on the motor. As is apparent, this is a complete propulsion module or "kit" to convert a bicycle into an electric bicycle. That is, if voltage is applied to the motor, the motor can drive the pinion sprocket, which in turn can drive the larger target sprocket 202, and it works as a unitary self-contained module. Further, this unitary power module 200 can be attached to the outer diameter of the bicycle wheel hub 122. The mounting frame 204 is easily rotated around the wheel axle for any position to attach to the frame 106 which does not interfere with the bicycle frame stays 112.

In another embodiment of the invention illustrated in FIG. 15, an electric bicycle 400 comprises a frame 106 having a rider seat 115 and propulsion controls 328 positioned thereon. A steerable front wheel 102 via the handle bars 109 has an axle 118 affixed to a front portion of said frame 106, together with a rear wheel 104 having an axle with a wheel pattern affixed to a rear portion of the frame. A propulsion system 400 comprises a battery 300 affixed to the bicycle 400, and an electric motor 230 having a pinion sprocket 242 affixed thereon the electric motor 230 suitable to be connected to the battery 300 by a battery cable 232. These components, together with the above-described unitary power module, comprise the electric bicycle 400 in accordance with the present invention.

Figure 16A:
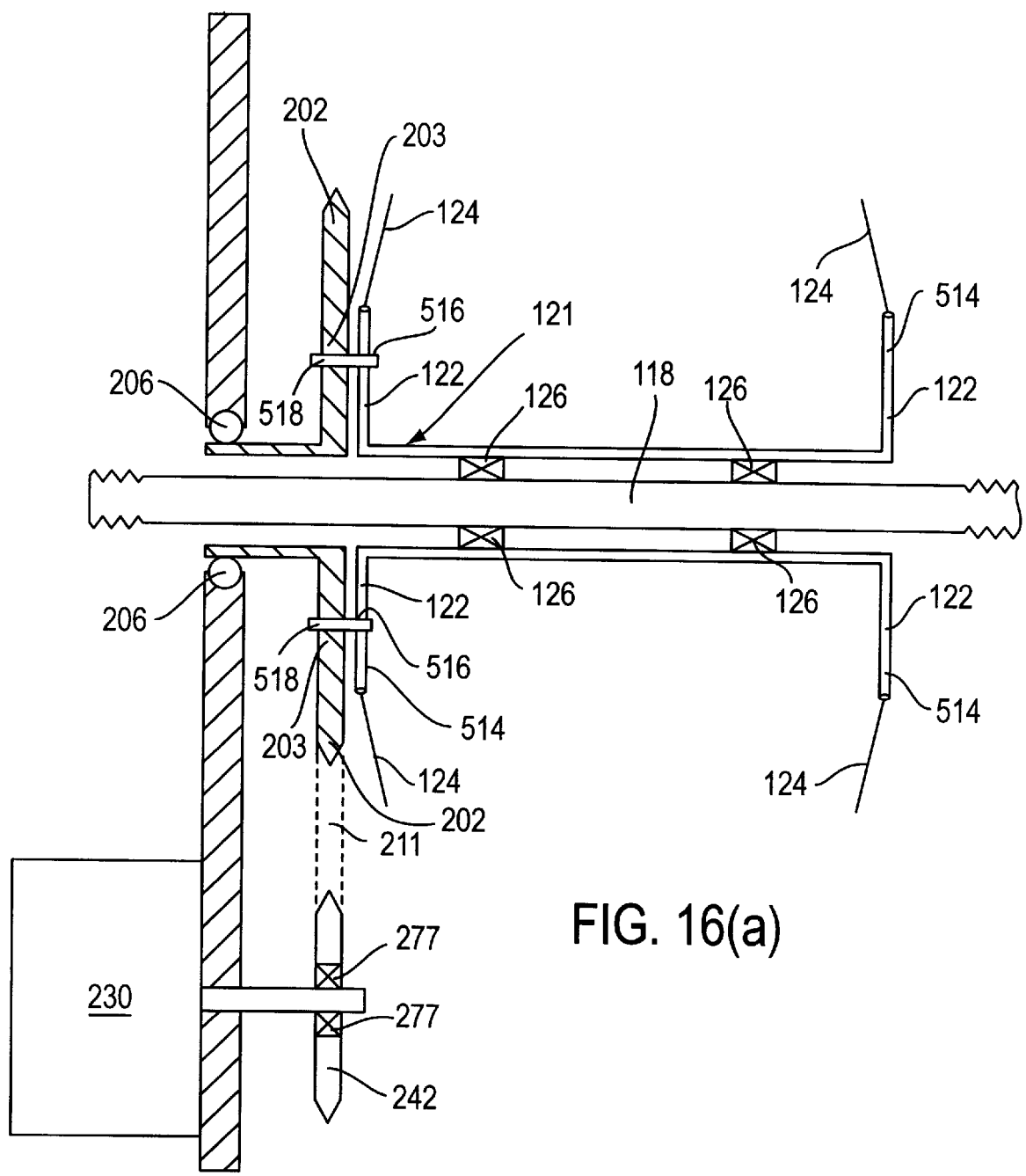
FIGS. 16(a), 16(b) and 16(c) are illustrative cross sectional views of alternative embodiments of target coupler suitable to mate the target sprocket to a bicycle wheel.

As illustrated in FIGS. 16(a), (b) and (c) the practice of the invention of FIG. 15 (and of FIGS. 1–14) is not limited to a target coupler 203 having a "criss-cross" spoke pattern, but may use a various embodiments of a target coupler 203 for transferring rotational power to the rear wheel and provide an independent self-aligned system. Turning now to FIGS. 16(a), (b) and (c), with like numerals illustrating like elements, the hub 122 rotates around a bearing assembly 126. The hub 122 has a "extended" flange 514 having a sufficient annular extension to form a plurality of openings 516 about the flange 514 to receive securing elements 518, such as studs, bolts, screws or like, positioned in a matched plurality of openings 522 on or within the target sprocket 202. In this manner, the target sprocket 202 in combination with the elements 518 from the target coupler 203. In this embodiment, the free wheeling clutch 277 is positioned on the pinion sprocket 242.

Figure 16B:
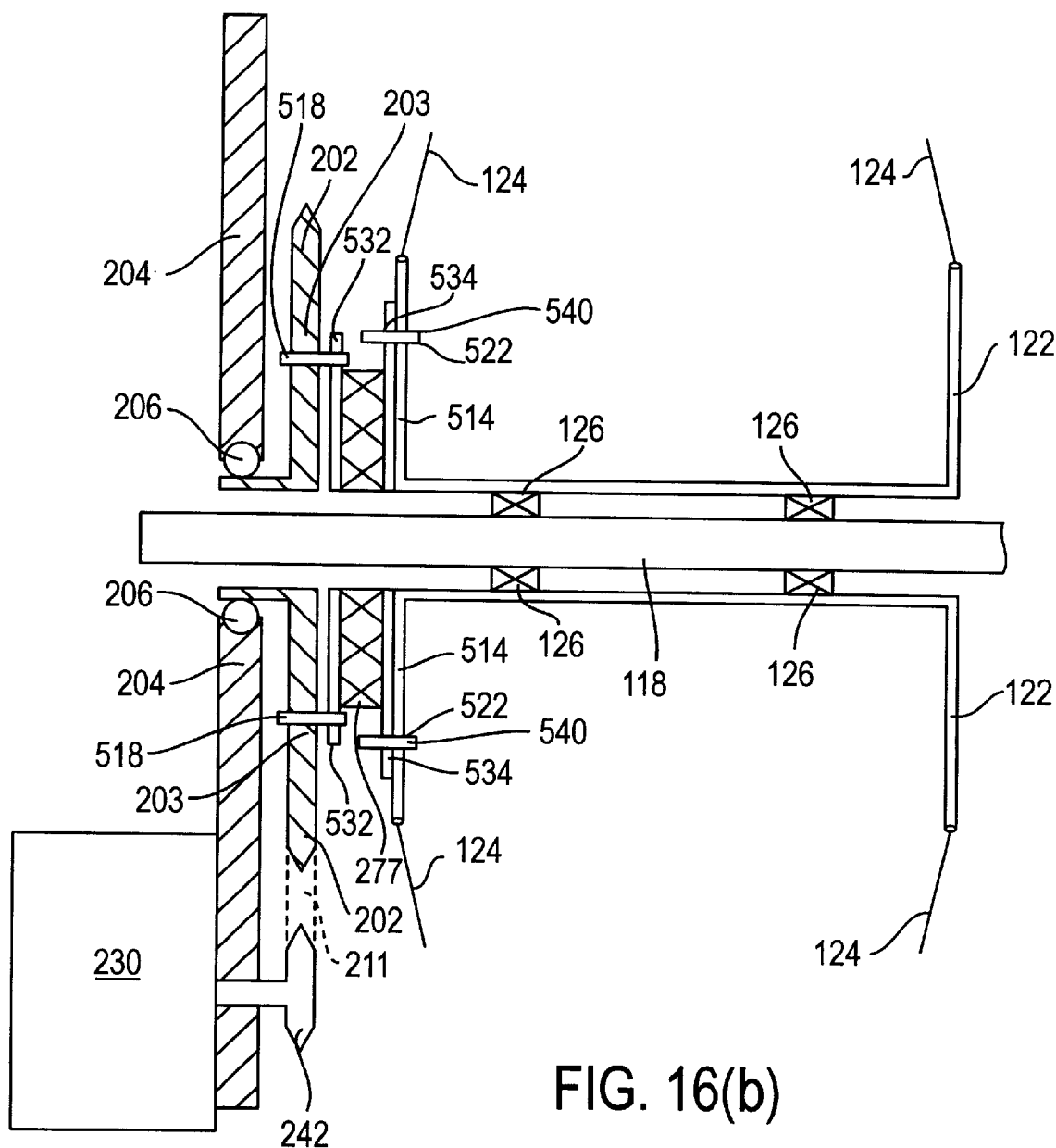

Turning now to FIG. 16(b), the free wheel clutch is positioned between target sprocket 202 and hub 122. The hub 122 has extended flanges 532, 534 which are proximate or adjacent to target sprocket 202 and hub flange 514, respectively. Securing elements 518, such as studs, bolts, screws or like, positioned in a matched plurality of openings 522 on or within the target sprocket 202 mate with a plurality of openings 536 in the free wheel flange 532. Securing elements 540, such as studs, bolts, screws or like, positioned in a matched plurality of openings 538 on or within the free wheel flange 534 mate with a plurality of openings 522 in the target sprocket. In this manner, the combination of the target sprocket 202, the flanges 532,534 on the free wheel clutch 277 and securing elements 518 and 540 form the target coupler 203.

Figure 16C:
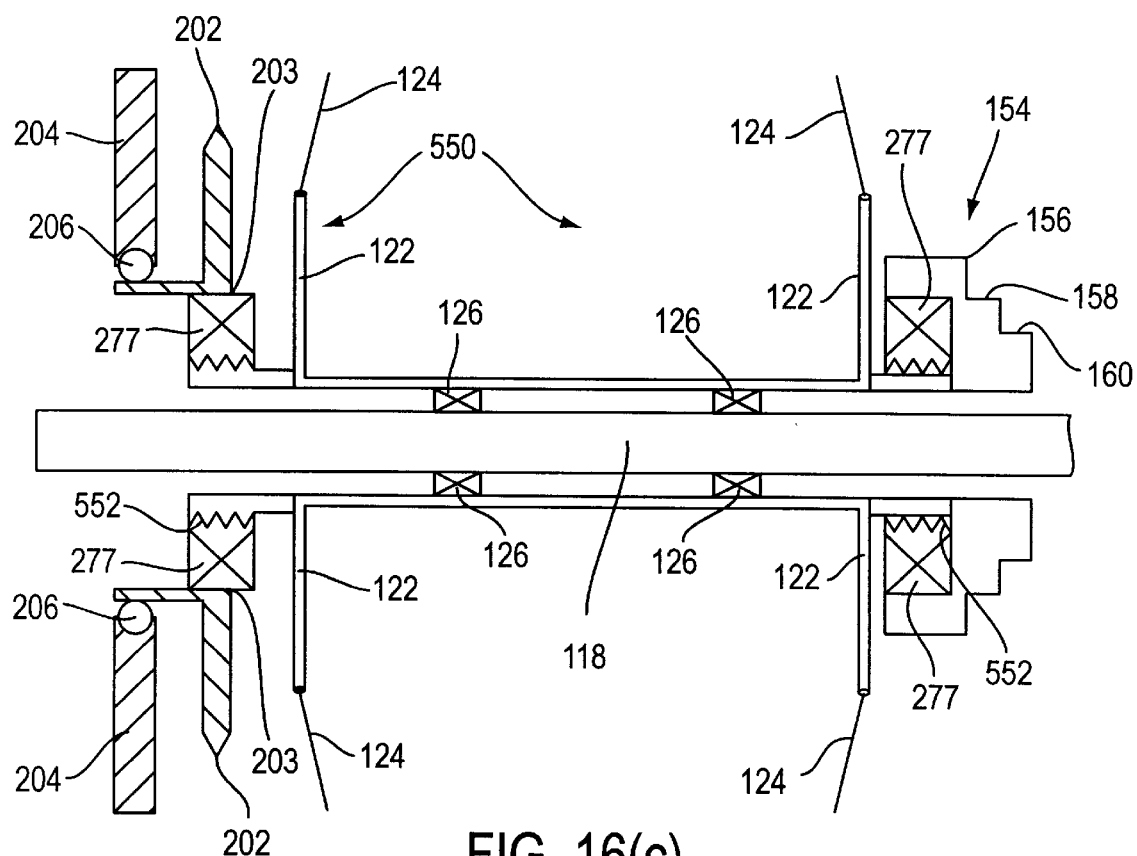

FIG. 16(c) shows a double ended hub 550 having a pair of free wheel clutches 277 on the outside of each extended hub flange 514 of the flange 122 with the target sprocket 202 placed in an annular configuration about the free wheel clutches 277. The free wheel clutches 277 are affixed to the axle by use of a thread 552 positioned thereon. In this manner, the target sprocket the combination of the target sprocket, free wheel clutches 277 and axle thread 552 form the target coupler 203.

Figure 17:
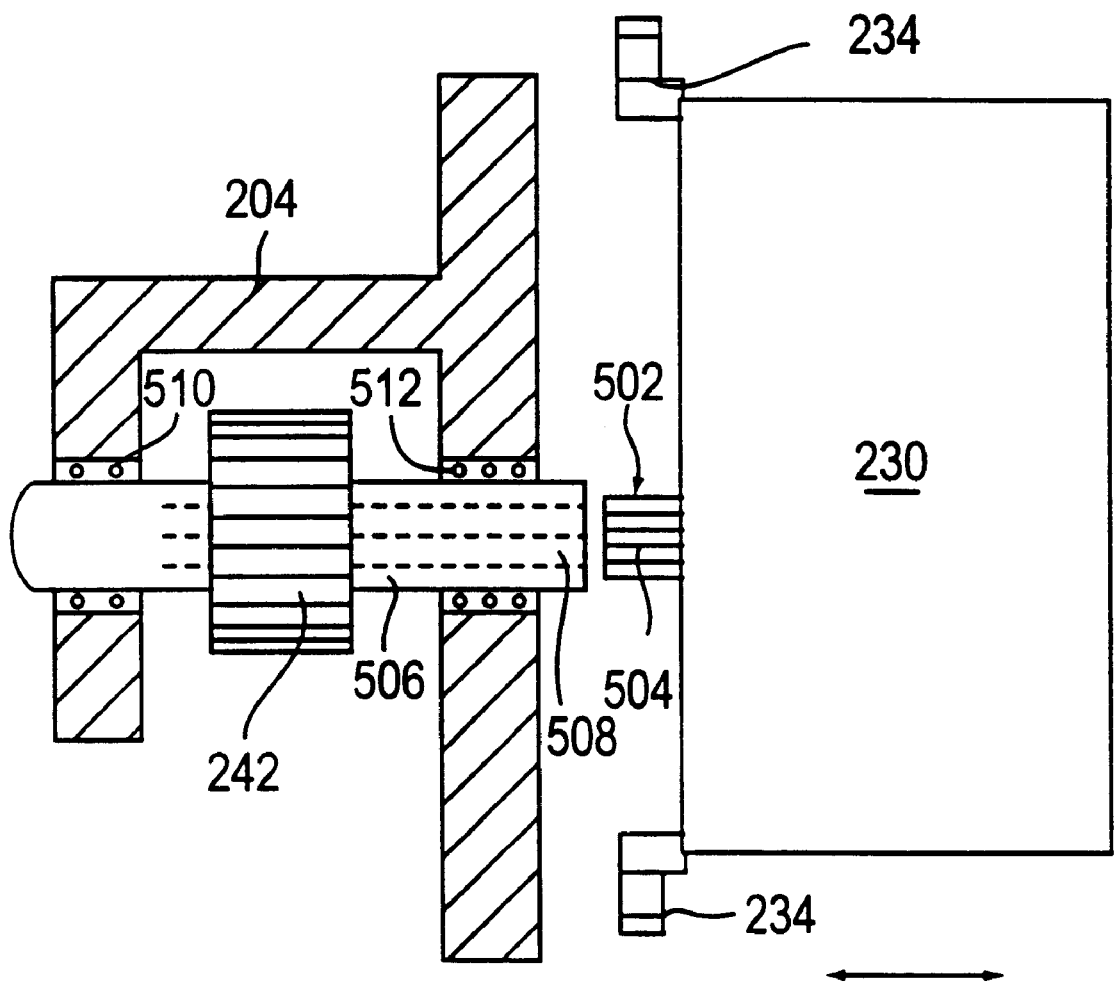
FIG. 17 is a cross sectional view of a quick disconnect motor mount which may be used with the unitary power module using a gear drive.

Turning now to FIG. 17, a quick disconnect motor mount 500 which may be used with the present invention using either a chain, or belt drive as illustrated. For example, the "quick disconnect" feature for the motor 230 will be used in several applications such as for folded bicycles, or in areas where security of the motor 230 may be required. The "quick disconnect" feature can be used where the motor shaft 502 ends with an spline which slides in and out of the shaft on which a sprocket or sprockets is/are mounted. As illustrated, the motor shaft comprises an external spline 504, which engages a shaft 506 with an internal spine 508 which is supported by two bearings 510,512 spaced apart on the mounting frame 204. The motor housing comprises includes quick release tabs 234, or the like, which may be quickly moved, thereby allowing the motor shaft 502 to be withdrawn or inserted within the shaft internal spline 508.

Figure 18A:
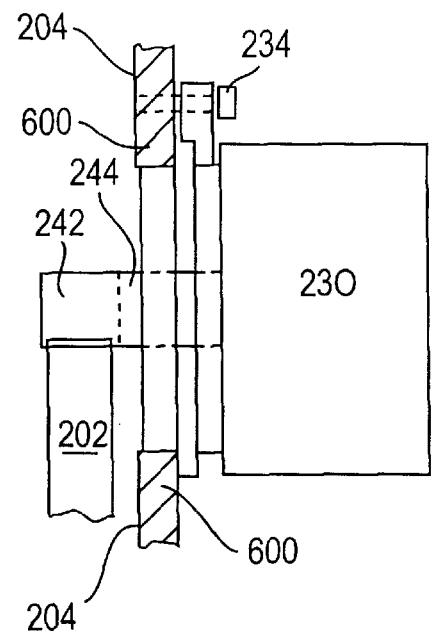
FIGS. 18(a), 18(b) and 18(c) further illustrate the motor mounting system of FIG. 17 in a locked and an unlocked position.
Figure 18B:
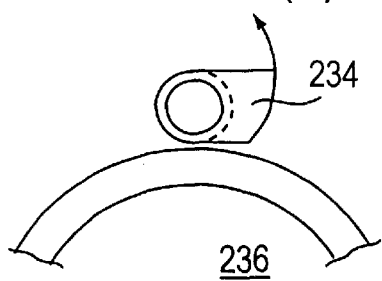
Figure 18C:
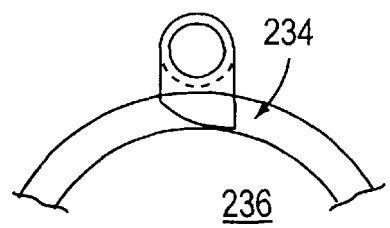

Turning now to FIGS. 18(a), (b) and (c) a quick disconnect motor mount 600 which may be used with the present invention using a gear drive. Because of the gear to gear engagement between the pinion sprocket 242 and the target sprocket 202, merely rotating the tabs as illustrated in FIGS. 18(a), (b) and (c) allows the motor to be removed from a unlocked to a locked position, respectively. As is apparent, by the mounting frame 204 including a shaft suitable to engage and disengage a motor shaft 244 from a power to a non-power posture upon either engagement or the disengagement of the motor 230 from the mounting frame, the motor 230 may quickly be removed for storage and safekeeping when necessary.

Merely by way of illustration, the following examples set forth typical design parameters to achieve predetermined performance of torque and efficiency.

EXAMPLE 1

The present unitary power module can provide optimum bicycle performance of torque and efficiency by reducing the RPM's of a high RPM motor to a relatively low number of revolutions per minute ("RPM") suitable to power the bicycle at a predetermined speed. For example, for a given pinion of modest diameter of 1" (which is necessary to keep the unitary power module reasonably small overall), the overall speed reduction of the motor RPM can be determined by the selection of the target sprocket. For a given target sprocket diameter of 7" and the pinion diameter of 1", the resultant reduction ratio is 7:1. If a pinion gear is used, it must be of this order of diameter to permit at least several teeth to engage the driven gear for low noise, efficiency and stress. At 10 miles per hour ("MPH") for a 26" wheel bicycle, the RPM. of the wheel and the driven gear is 155 RPM. This would be for a motor of 1085 RPM.

EXAMPLE 2

Since most available motors run most efficiently at 3000 RPM or above, a much higher reduction ratio is required. As illustrated in FIGS. 10(a) and 10(b), the desired ratio can easily be achieved with the 2-chain unitary power module and the planetary gear configuration previously described. In using an electric motor having an optimal rotational capacity of about 3000 R.P.M., a bicycle speed of about 12 MPH can be achieved as follows. By reference to the above FIGS. 10(a) and 10(b), S1=1", S2=4", S3=1" and S4=4½". Thus, a gear reduction ratio of about 18 or 20 is accomplished and the above RPM speed to the bicycle wheel can be achieved.

It is to be understood that variations on the embodiments of the invention are possible. For example, the invention can be applied to either the front wheel of the bicycle or the rear wheel, in a similar manner as is described above by the application of the invention to the rear wheel. This is readily achieved, as the power cable from the battery appropriately placed is flexible and can readily adapted to reach and engage the motor.

In yet another variation, the mounting frame may have a hollow extension collar which can be attached by a bearing to the inside of the target sprocket, such that the target sprocket freely rotates about the hollow extension collar.

In another variation, the present invention can be applied to numerous applications where the advantages of implementing the invention can be gained, such as mopeds, scooters, and motorcycles; three wheeled vehicles including tricycle-like vehicles; four wheeled vehicles including wheel chairs, surrey style, golf cart style and delivery style vehicles; multi-wheeled vehicles, material handling systems including conveyor and pick-and-place style systems, and robotics.

In a further variation of the invention, the target wheel can be extended beyond a spoke wheel to any target wheel of any propulsion system. While the relative commonality of spoke weave pattern and configuration is important, it is not critical to implementing the invention. For instance, in a solid "disk" wheel, the disk would have mounting holes, which would attach to the wheel in such a way to maintain concentricity with the wheel.

In yet another variation, the invention can be applied to various drive sources including electric motors, gasoline engines, or any other type of rotating drive source which would suitable for mounting to a mounting frame of the present invention.

In yet a further variation, the mounting frame may include a receiving collar, spleen or other suitable mechanical connection, which allows to target coupler to be precisely aligned to the mounting frame. In this manner, an opening in the mounting plate is not necessarily required.

The embodiments described above provide a number of significant advantages. For example, because the propulsion system consists of the motor, pinion sprocket, clutch, target sprocket, and target wheel, this invention holds the entire propulsion system within the same reference frame mandated by the mounting plate, thereby constraining the propulsion system tolerances within the propulsion system. These tolerances are determined by the manufacturing tolerances of the propulsion system components as designed independent of the vehicle manufacturing tolerances. This allows the propulsion system to be applied to any vehicle, while maintaining the performance of the propulsion system.

This reference mounting frame is formed by the target sprocket or disk with the hollow extension collar and grooved surface conforming a wheel pattern. This disk provides solid mounting attachment with the wheel through the grooved surface mating with the wheel hub and spokes. The disk is held concentric with the wheel hub. The sprocket gear is attached to the reference frame disk through either a free-wheeling clutch or directly attached to the reference frame disk. The motor mounting frame is attached to the reference frame disk through a bearing on the hollow extension collar of the disk. The motor is attached to the motor mounting frame, in such a way as to provide for proper meshing of the pinion and driven (or sprocket) gears, independent of axle and hub bearing tolerances. The pinion sprocket is attached to the motor either directly, or through a one-way roller clutch, depending on whether the driven (or sprocket) gear has a free-wheeling clutch. The motor mounting frame is clamped to the bicycle frame to prevent rotation of the mounting frame. In this manner, the drive and target elements are properly aligned to a single reference frame. This unitary or integrated feature of the propulsion system being self-contained can be demonstrated by holding the entire assembly by hand and running it. It should be noted that this invention avoids the axle assembly of the wheel, and as a result avoids the tolerance problems associated with the axle and bearing. This is a significant, important aspect of this invention, and separates it from other drive systems.

Another important advantage of the invention include the fact that the tolerances of the propulsion system are independent of the vehicle. The pinion sprocket is held to the driven gear by the tolerances of the propulsion system, rather than the tolerances of the axle or bearing of bicycle frame. The axis of the pinion sprocket and motor are held parallel with the wheel and target sprocket by the tolerances of the propulsion system, specifically the mounting frame and reference target sprocket. In the case of using gears, the meshing of the pinion sprocket (or pinion) and target sprocket gears are held to the tolerances of the propulsion system. Thus, the reference frame disk provides the stable attachment of the propulsion assembly to the wheel.

Of course, it should be understood that a wide range of changes and modifications can be made to the preferred embodiment described above. It is therefore intended that the foregoing detailed description be understood that it is the following claims, including all equivalents, which are intended to define the scope of this invention.

We claim:

1. A unitary power module suitable for a wheeled vehicle comprising:
   a target sprocket defining a generally disk shaped member having a center opening to allow said target sprocket to be placed about a wheel axle adapted to be supported on the frame of the vehicle, said target sprocket having a target coupler having a groove pattern suitable to be engagable with a woven spoke pattern of a wheel of said vehicle to enable said target sprocket to be substantially concentrically attached to said wheel by engagement with said target coupler to said wheel; and
   a mounting frame aligned with and rotatably attached to said target sprocket by an extension of said target sprocket to allow for aligned rotation of said target sprocket about said wheel axle, said mounting frame disposed to receive an electric motor to enable a pinion sprocket affixed on said electric motor to propel said target sprocket and rotate said wheel, said mounting frame providing a single point of reference for aligning said pinion sprocket with said target sprocket.

2. The invention of claim 1 additionally including an electric motor having a pinion sprocket thereon, said electric motor affixed to said mounting frame.

3. The invention of claim 1 wherein the target sprocket includes a hollow collar which attaches to said mounting frame by a bearing.

4. The invention of claim 3 wherein said hollow shaft includes a free wheel clutch positioned adjacent proximate to said target sprocket.

5. The invention of claim 1 wherein a free wheel clutch is affixed to a shaft upon which said pinion gear is mounted and said pinion sprocket is positioned adjacent to and engages said free wheel clutch.

6. The invention of claim 1 wherein said target coupler is integral with said target sprocket and is disposed to be affixed to a flange of a hub of a wheel.

7. The invention of claim 1 or 4 wherein said target coupler is integral with said target sprocket.

8. The invention of claim 1 wherein said target coupler groove pattern defines a pattern suitable to mate a thirty six spoke three cross woven spoke pattern of the bicycle wheel.

9. The invention of claim 1 wherein said target sprocket mates a hub of a bicycle wheel.

10. The invention of claim 1 wherein said target sprocket and pinion sprocket each have a plurality of teeth suitable to be engaged by a drive chain.

11. The invention of claim 1 wherein said target sprocket and pinion sprocket each have a plurality of gear teeth suitable to be engaged by one another.

12. The invention of claim 1 wherein said target sprocket and pinion sprocket each have a surface suitable to be engaged by a drive belt.

13. A unitary power module kit for converting a standard bicycle to an electric powered bicycle, said standard bicycle having a frame and front and rear wheels mounted thereon, each wheel having a hub and wheel pattern with an axle:

a member comprising a target sprocket and a mounting frame, said target sprocket comprising a disk shaped assembly having an opening to allow said member to be placed about the axle, said target sprocket having a target coupler engagable with one of said wheels of said bicycle to enable said target sprocket to be substantially concentrically attached to said wheel by engagement with the wheel by securing elements, said target coupler includes a groove pattern disposed to mate a woven spoke pattern of the bicycle wheel; and said mounting frame aligned with and ratably attached to said target sprocket to allow for aligned rotation of said target sprocket about said wheel axle, said mounting frame having an element suitable to receive an electric motor to enable a pinion sprocket affixed on said electric motor to propel said target sprocket and rotate said bicycle wheel, said mounting frame providing a single point of reference for aligning said pinion sprocket with said target sprocket.

14. The invention of claim 13 additionally including an electric motor having a pinion sprocket thereon, said electric motor disposed to be connected to said mounting frame, said electric motor suitable to be connected to a battery by an electrical connector.

15. The invention of claim 14 additionally including a battery suitable to power said electric motor is disposed to be connected to an electrical connector.

16. The invention of claim 13 additionally including an electric motor having a pinion sprocket affixed to said mounting frame, said electric motor connected to a battery by a connector and connected to an electrical control to regulate the speed of the electrical motor.

17. The invention of claim 13 wherein the target sprocket includes a hollow collar which attaches to said mounting frame by a bearing.

18. The invention of claim 17 wherein said hollow shaft includes a free wheel clutch positioned adjacent proximate to said target sprocket.

19. The invention of claim 13 wherein a free wheel clutch is affixed to a shaft upon which said pinion gear is mounted and said pinion sprocket is positioned adjacent to and engages said free wheel clutch.

20. The invention of claim 13 wherein said target coupler is integral with said target sprocket and is disposed to be affixed to a flange of a hub of a bicycle wheel.

21. The invention of claim 13 wherein said target coupler is integral with said target sprocket.

22. The invention of claim 13 wherein said target coupler groove defines a pattern suitable to mate a thirty six spoke, three cross woven spoke pattern of the bicycle wheel.

23. The invention of claim 13 wherein said target sprocket mates a hub of a bicycle wheel.

24. The invention of claim 13 wherein said target sprocket and pinion sprocket each have a plurality of teeth suitable to be engaged by a drive chain.

25. The invention of claim 13 wherein said target sprocket and pinion sprocket each have a plurality of gear teeth suitable to be engaged by one another.

26. The invention of claim 13 wherein said target sprocket and pinion sprocket each have a surface suitable to be engaged by a drive belt.

27. An electric bicycle comprising a frame having at least one wheel with an axle and hub affixed to a portion of the frame, the frame adapted to receive a battery, a connector suitable to connect the battery and the motor, and a controller suitable to control the speed of a motor;

a unitary power module comprising:

a unitary member comprising a target sprocket and a mounting frame, said sprocket comprising a disk shaped assembly having an opening to allow said unitary member to be placed about the axle, said target sprocket having a target coupler engaging a wheel of said bicycle to enable said target sprocket to be substantially concentrically attached to said rear wheel by engagement with said wheel, said target coupler includes a groove pattern disposed to mate a woven spoke pattern of the bicycle wheel; and said mounting frame aligned with and rotatably attached to said unitary member by a bearing for aligned rotation of between said mounting frame and target sprocket, said mounting frame having an element to receive an electric motor, said electric motor having a pinion sprocket disposed to engage said target sprocket to rotate said wheel upon application by the rider of propulsion controls, said mounting frame securable to said bicycle frame, said mounting frame providing a single point of reference for aligning said pinion sprocket with said target sprocket.

28. An electric bicycle comprising:

a frame having a rider seat and propulsion controls positioned and thereon;

a steerable front wheel having an axle affixed to a front portion of said frame;

a rear wheel having an axle affixed to a rear portion of said frame;

a unitary power module comprising:

an electric motor having a pinion sprocket affixed thereon, said electric motor suitable to be connected by a connector to a battery by a battery cable and to a controller to regulate motor speed;

a unitary member comprising a target sprocket and a mounting frame, said sprocket comprising a disk shaped assembly having an opening to allow said unitary member to be placed about the axle, said target sprocket having a target coupler engaging a wheel of said bicycle to enable said target sprocket to be substantially concentrically attached to said rear wheel by engagement with the wheel, said target coupler includes a groove pattern disposed to mate a woven spoke pattern of the bicycle wheel; and said mounting frame aligned with and rotatably attached to said unitary member by a bearing for aligned rotation of between said mounting frame and target sprocket, said mounting frame having an element to receive said electric motor to enable said pinion sprocket to engage said target sprocket to rotate said wheel upon application by the rider of propulsion controls, said mounting frame secured to a fixed portion of said bicycle, said mounting frame providing a single point of reference for aligning said pinion sprocket with said target sprocket.

29. The invention of claims 27 or 28 additionally including an electric motor having a pinion sprocket disposed to connected to said mounting frame, said electric motor suitable to be connected to a battery by an electrical connector.

30. The invention of claims 27 or 28 wherein a battery suitable to power said electric motor is disposed to be connected to an electrical connector.

31. The invention of claims 27 or 28 additionally including an electric motor having a pinion sprocket affixed to said mounting frame, said electric motor connected to a battery by a connector and connected to the controller to regulate the speed of the electrical motor.

32. The invention of claim 27 or 28 wherein the target sprocket includes a hollow collar which attaches to said mounting frame by a bearing.

33. The invention of claim 27 or 28 wherein said hollow shaft includes a free wheel clutch positioned adjacent proximate to said target sprocket.

34. The invention of claim 27 or 28 wherein a free wheel clutch is affixed to a shaft upon which said pinion gear is mounted and said pinion sprocket is positioned adjacent to and engages said free wheel clutch.

35. The invention of claim 27 or 28 wherein said target coupler is integral with said target sprocket and is disposed to be affixed to a flange of a hub of a bicycle wheel.

36. The invention of claim 27 or 28 wherein said target coupler is integral with said target sprocket.

37. The invention of claim 27 or 28 additionally including free wheel clutch connected to the motor shaft upon which said pinion gear is mounted, said pinion sprocket positioned adjacent to and engaging said free wheel clutch, and said target coupler is integral with said target sprocket.

38. The invention of claim 27 or 28 wherein said target coupler groove pattern defines a pattern suitable to mate a thirty-six, three cross woven spoke pattern of the bicycle wheel.

39. The invention of claims 27 or 28 wherein said target sprocket mates a disk shaped bicycle wheel.

40. The invention of claim 27 or 28 wherein said target sprocket and pinion sprocket each have a plurality of teeth suitable to be engaged by a drive chain.

41. The invention of claims 27 or 28 wherein said target sprocket and pinion sprocket each have a plurality of gear teeth suitable to be engaged by one another.

42. The invention of claims 27 or 28 wherein said target sprocket and pinion sprocket each have a surface suitable to be engaged by a drive belt.

43. A unitary power module suitable for mounting a propulsion system on a wheeled vehicle comprising:

a target sprocket defining a disk shaped member having a center opening suitable to allow said sprocket to be placed about a wheel axle of said wheeled vehicle, said target sprocket having a target coupler including a grooved pattern suitable for mating a woven spoke wheel pattern of a wheel of said wheeled vehicle for enabling said sprocket to be substantially concentrically attached to said wheel by engagement with said wheel by securing elements, and a mounting frame rotatably attached to said target sprocket suitable to allow for rotation of said sprocket about said wheel axle, said mounting frame having an element to receive an electric motor to enable a pinion sprocket affixed on said motor to engage a second sprocket mounted on a second shaft positioned on said mounting frame, said second shaft having a third sprocket mounted thereon, said second sprocket substantially aligned with and engaging said pinion sprocket and said third sprocket substantially aligned with and engaging said target sprocket to propel said target sprocket upon rotation of said pinion sprocket and rotate said wheel, said mounting frame providing a single point of reference for aligning said pinion sprocket with said second sprocket and said third sprocket with said target sprocket.

44. A propulsion system kit for converting a standard bicycle having a frame and rear hub wheel having a pattern with an axle to an electric bicycle comprising:

an electric motor having a pinion sprocket gear affixed thereon, said electric motor suitable to be connected to a battery by a battery cable;

a unitary power module for mounting a propulsion system on a bicycle comprising:

a target sprocket defining a disk shaped member having a center opening to allow said sprocket to be placed about a wheel axle of said bicycle, said target sprocket having a target coupler mating a wheel pattern of a wheel of said bicycle to enable said sprocket to be substantially concentrically attached to said wheel by engagement with securing elements, said target coupler includes a groove pattern disposed to mate a woven spoke pattern of the bicycle wheel; and a mounting frame aligned with and rotatably attached to said target sprocket to allow for aligned rotation of said target sprocket about said wheel axle and having an element to receive an electric motor to enable a pinion sprocket affixed on said motor to engage a second sprocket positioned thereon by a second shaft, said second sprocket shaft having a third sprocket suitable for engagement with said target sprocket to propel said target sprocket and rotate said bicycle wheel upon rotation of said pinion sprocket via said electric motor, said mounting frame providing a single point of reference for aligning said pinion sprocket with said second sprocket and said target sprocket and said third sprocket.

45. An electric bicycle comprising a frame having a rider seat and propulsion controls positioned and thereon;

a steerable front wheel having an axle affixed to a front portion of said frame;

a rear wheel having an axle with a pattern affixed to a rear portion of said frame;

a propulsion system comprising:

an electric motor having a pinion sprocket affixed thereon, said electric motor suitable to be connected to a battery by a battery cable;

a unitary power module for mounting a propulsion system on a bicycle comprising:

a target sprocket defining a disk shaped member having a center opening to allow said sprocket to be placed about a wheel axle of said bicycle, said target sprocket having a target coupler mating a wheel pattern of a wheel of said bicycle to enable said sprocket to be substantially concentrically attached to said wheel by engagement with said wheel pattern by securing elements, said target coupler includes a groove pattern disposed to mate a woven spoke pattern of the bicycle wheel; and a mounting frame aligned with and rotatably attached to said target sprocket to allow for aligned rotation of said target sprocket about said wheel axle and having an element to receive an electric motor to enable a pinion sprocket affixed on said motor to engage a second sprocket positioned on a second shaft thereon, said second sprocket shaft having a third sprocket positioned for engagement with said target sprocket to propel said target sprocket and rotate said bicycle wheel upon rotation of said pinion sprocket via said electric motor, said mounting frame providing a single point of reference for aligning said pinion sprocket with said second sprocket and said target sprocket and said third sprocket.

46. The invention of claims 44 or 45 additionally including an electric motor having a pinion sprocket disposed to connected to said mounting frame, said electric motor suitable to be connected to a battery by an electrical connector.

47. The invention of claims 44 or 45 wherein a battery suitable to power said electric motor is disposed to be connected to an electrical connector.

48. The invention of claims 44 or 45 additionally including an electric motor having a pinion sprocket affixed to said mounting frame, said electric motor connected to a battery by a connector and connected to a controller on said bicycle to regulate the speed of the electrical motor.

49. The invention of claim 44 or 45 wherein the target sprocket includes a hollow collar which attaches to said mounting frame by a bearing.

50. The invention of claim 44 or 45 wherein said hollow shaft includes a free wheel clutch positioned adjacent proximate to said target sprocket.

51. The invention of claim 44 or 45 wherein a free wheel clutch is affixed to a shaft upon which said pinion gear is mounted and said pinion sprocket is positioned adjacent to and engages said free wheel clutch.

52. The invention of claim 44 or 45 wherein said target coupler is integral with said target sprocket and is disposed to be affixed to a flange of a hub of a bicycle wheel.

53. The invention of claim 44 or 45 wherein said target coupler is integral with said target sprocket.

54. The invention of claim 44 or 45 additionally including a free wheel clutch connected to the motor shaft upon which said pinion gear is mounted, said pinion sprocket positioned adjacent to and engaging said free wheel clutch, and said target coupler is integral with said target sprocket.

55. The invention of claim 44 or 45 wherein said target coupler groove pattern disposed to mate a thirty-six, three cross woven spoke pattern of the bicycle wheel.

56. The invention of claims 44 or 45 wherein one plane provides a single point of reference for substantially aligning said pinion sprocket with said second sprocket and second plane provides another point of reference for substantially aligning said third sprocket with said target sprocket.

57. The invention of claim 44 or 45 wherein said target sprocket, said second sprocket, said third sprocket and said pinion sprocket each have a plurality of teeth suitable to be engaged by a drive chain.

58. The invention of claims 43, 44 or 45 wherein said mounting frame additionally includes a chain connected to said pinion sprocket to rotate said second sprocket, which in turn rotates the third sprocket via the second shaft to engage said target sprocket by a second chain to rotate said target sprocket.

59. The invention of claims 43, 44 or 45 wherein said pinion sprocket, said second shaft and said target sprocket are positioned to be substantially along a straight line along said mounting frame.

60. The invention of claims 1, 13, 27, 28, 43, 44 or 45 wherein said mounting frame additionally includes a second opening suitable to receive a second electric motor having a second pinion sprocket, said pinion sprocket and second pinion sprocket connectable to and aligned so as to each motor is deposed to provide rotational power to said drive module.

61. A target sprocket for an electric bicycle propulsion system comprising a disk shaped member having an opening to allow a target coupler affixed to said target sprocket to be placed about a bicycle wheel axle, said target sprocket having a spoke groove pattern suitable to be eneagable with a spoke bicycle wheel to enable said sprocket to be concentrically attached to said wheel by engagement of securing elements, said target sprocket engagable disposed to be securable to a bicycle wheel and to a mounting frame about a bearing affixed on said mounting frame thereby providing a single point of reference for aligning a pinion sprocket of a motor affixed to said mounting frame with said target sprocket.

62. The invention of claim 61 wherein a free wheel clutch is affixed to said target sprocket.

63. A mounting frame for an electric bicycle propulsion system, said mounting frame having a first element and adapted to be disposed to receive an electric motor having a pinion sprocket, said mounting frame also having a second element adapted to be disposed to receive a target sprocket having a target coupler which includes a groove pattern disposed to mate a woven spoke pattern of a bicycle wheel, said mounting frame having a bearing affixed about one of said elements for receiving a securing said target sprocket, said mounting frame adapted to provide a single point of reference for aligning said pinion sprocket with said target sprocket.

64. The invention of claim 63 in combination with an electrical motor having a pinion sprocket proximate to said first element, and a target sprocket proximate said second element.

65. The invention of claim 63 wherein said pinion sprocket is positioned proximate to and engaging a free wheel clutch.

66. The invention of claims 13, 27, 28, 44 and 45 wherein an electric motor having a pinion sprocket is disposed to be connected to said mounting frame, said electric motor having a planetary gear positioned between said motor and pinion sprocket.

67. The invention of claim 66 wherein the planetary gear reduces RPM's of said motor thereby providing reduced RPM's to said pinion sprocket.

68. The invention of claims 27, 28 and 45, wherein said electric bicycle additionally includes a rider propelled drive mechanism, said mechanism including a crank journal having a chain sprocket connected by a chain to a rider target sprocket mounted on said wheel axle.

69. The invention of claim 68 wherein said rider target sprocket includes a derailleur having a plurality of sprockets thereon.

70. The invention of claims 1 and 43, wherein said mount frame additionally having an element suitable to engage a vehicle frame of said wheeled vehicle to prevent rotation of said power module relative to said vehicle frame.

* * * * *